(12) United States Patent
de Graffenried, Sr.

(10) Patent No.: US 9,212,058 B2
(45) Date of Patent: Dec. 15, 2015

(54) SYNTHETIC HYDROGEN-BASED GAS MANUFACTURE AND USE

(76) Inventor: Christopher Lawrence de Graffenried, Sr., Mahopac, NY (US)

(*) Notice: Subject to any disclaimer, the term of this patent is extended or adjusted under 35 U.S.C. 154(b) by 1096 days.

(21) Appl. No.: 12/426,266

(22) Filed: Apr. 19, 2009

(65) Prior Publication Data

US 2010/0266908 A1    Oct. 21, 2010

(51) Int. Cl.
| | | |
|---|---|---|
| B01J 7/00 | (2006.01) | |
| C01B 3/34 | (2006.01) | |
| H01M 8/04 | (2006.01) | |
| H01M 8/06 | (2006.01) | |
| C10J 3/46 | (2006.01) | |
| F26B 3/08 | (2006.01) | |
| H01M 8/12 | (2006.01) | |
| B64D 41/00 | (2006.01) | |

(52) U.S. Cl.
CPC ............ *C01B 3/342* (2013.01); *C10J 3/466* (2013.01); *F26B 3/08* (2013.01); *H01M 8/04014* (2013.01); *H01M 8/04097* (2013.01); *H01M 8/04156* (2013.01); *H01M 8/0612* (2013.01); *H01M 8/0662* (2013.01); *B64D 2041/005* (2013.01); *C01B 2203/0266* (2013.01); *C01B 2203/066* (2013.01); *C01B 2203/0861* (2013.01); *C01B 2203/1241* (2013.01); *C01B 2203/84* (2013.01); *C01B 2203/86* (2013.01); *C10J 2300/093* (2013.01); *C10J 2300/0909* (2013.01); *C10J 2300/1238* (2013.01); *C10J 2300/1646* (2013.01); *H01M 2008/1293* (2013.01); *Y02E 20/18* (2013.01); *Y02E 20/185* (2013.01); *Y02E 60/50* (2013.01); *Y02E 60/525* (2013.01); *Y02T 90/36* (2013.01)

(58) Field of Classification Search
None
See application file for complete search history.

(56) References Cited

U.S. PATENT DOCUMENTS

| | | | | |
|---|---|---|---|---|
| 3,989,512 | A * | 11/1976 | Sayce | 75/10.22 |
| 4,181,504 | A * | 1/1980 | Camacho | 48/197 R |
| 5,280,757 | A * | 1/1994 | Carter et al. | 110/346 |
| 6,752,972 | B1 * | 6/2004 | Fraim et al. | 422/198 |
| 6,987,792 | B2 * | 1/2006 | Do et al. | 373/18 |
| 7,622,693 | B2 * | 11/2009 | Foret | 219/121.43 |
| 2004/0170210 | A1 * | 9/2004 | Do et al. | 373/118 |
| 2004/0251241 | A1 * | 12/2004 | Blutke et al. | 219/121.59 |
| 2005/0019627 | A1 * | 1/2005 | Ozeki et al. | 429/20 |
| 2007/0141417 | A1 * | 6/2007 | Bitoh | 429/23 |
| 2007/0259228 | A1 * | 11/2007 | Hartvigsen et al. | 429/20 |
| 2008/0107935 | A1 * | 5/2008 | Degertekin et al. | 429/17 |
| 2008/0213637 | A1 * | 9/2008 | Steinberg | 429/17 |
| 2009/0004516 | A1 * | 1/2009 | Bai et al. | 429/17 |
| 2009/0019770 | A1 * | 1/2009 | Nacken et al. | 48/127.7 |
| 2009/0020456 | A1 * | 1/2009 | Tsangaris et al. | 208/133 |
| 2009/0035619 | A1 * | 2/2009 | Adams | 429/17 |
| 2009/0064581 | A1 * | 3/2009 | Nielsen et al. | 48/78 |

* cited by examiner

*Primary Examiner* — Kaity Handal
(74) *Attorney, Agent, or Firm* — Gearhart Law, LLC

(57) ABSTRACT

A method of producing hydrogen from hydro-carbon feed material is disclosed. A cylindrical plasma reaction region having a temperature greater than 800 C is created in a cylindrical reaction chamber by a cylindrical plasma array. The feed material is introduced into the plasma, where it undergoes plasma pyrolysis and is separated into hydrogen gas and solid carbon. The hydrogen gas is further purified using a hydrogen sieve that allows hydrogen through but retards larger molecules. The hydrogen gas is then feed into a fuel cell where it mixes with oxygen to provide electrical power. The plasma array may have one or more angled plasma arcs such that the plasma reaction region rotates as a vortex. There may also be two or more cylindrical plasma arrays arranged parallel to each other and to the cylindrical reaction chamber such that the feed material is fed through them.

10 Claims, 22 Drawing Sheets

Overview Schematic Diagram for Coal (part 1/2)

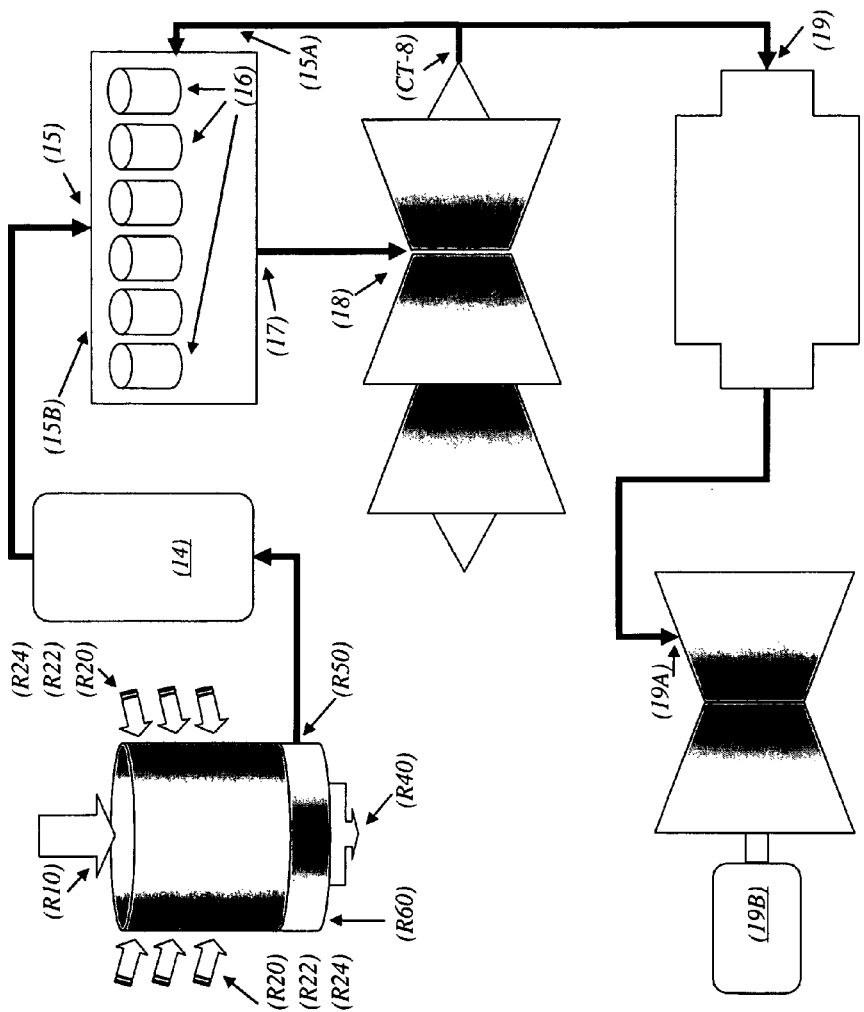
Figure 1 (*continued*)
Overview Schematic Diagram for Natural Gas (part 2/2)

Combustion Turbine compressed, heated, low relative humidity drying air supply

Cascading Five (5) Column Parallel-Series Counter-Flow Fluidized Bed Drier

Figure 4 *(continued)*
Overview Schematic – Plasma Sheet and Plasma Array
*(Part 2|2)*

*30° right, 30° down side view*          *"dead-on" end view*
                                          gas flow    Cathode sheet
Single-Piece Cathode Plasma Array

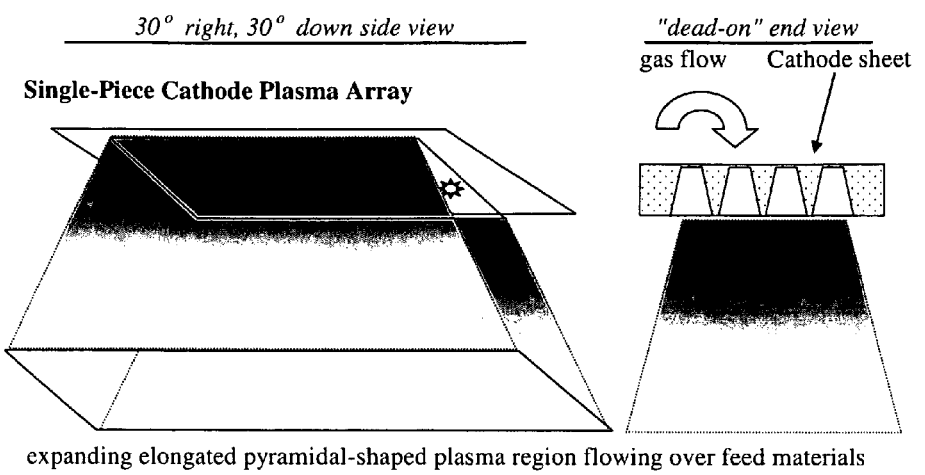

expanding elongated pyramidal-shaped plasma region flowing over feed materials

*30° right, 30° down side view*          *"dead-on" end view*
Multi-part Cathode Plasma Array

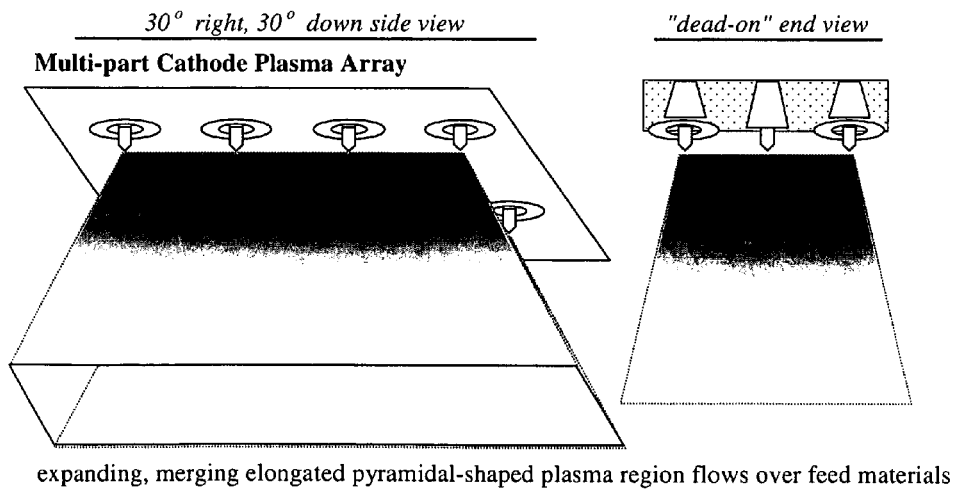

expanding, merging elongated pyramidal-shaped plasma region flows over feed materials Overall Micro-Reactor Train Process Schematic Diagram

Example Physical Arrangement #1 - Single Train P+FC Components

Note: Not drawn to exact scale

Split Train P+FC

Micro-Plasma Injector Array with Feed Material Injector
*End View*

Cross Section View - Injector Face

See Through Side View - Micro-Plasma Injector Array and Reacting Tube

*(Part 1|3)*

See Through Side View - High Temperature Process-Matched Solid Oxide Fuel Cell Section with Hydrogen Sieve Process-Matched Solid Oxide Fuel Cell (PM-SOFC) Section with Hydrogen Sieve
Side View – Half Section
(Part 213)

Process-Matched Solid Oxide Fuel Cell (PM-SOFC) Section with Hydrogen Sieve

*End View*

*(Part 313)*

SYNTHETIC HYDROGEN-BASED GAS MANUFACTURE AND USE

FIELD OF INVENTION

These inventions relate to apparatus, methods, processes and designs for the:
(5) Production of large volumes of heated, compressed, very low humidity drying air, as required to dry moist starting materials,
(6) Thorough drying of moist starting materials, such as pulverized coal, in the disclosed Parallel-Series Fluidized Bed ("PSFB") cascade drier,
(7) Production of a unique synthetic manufactured gas mixture substantially containing hydrogen ("H-Syngas") in a 3-dimensional plasma pyrolysis process step using the disclosed 3D3P Reactor and/or disclosed micro-reactor train, and
(8) Use of H-Syngas as an energy source and fuel for various purposes, including in a unique process-matched solid oxide fuel cell with a Hydrogen Sieve ("PM-SOFC").

H-Syngas may be produced from naturally dry hydrogen-bearing gases, such as natural gas, and many oils, as well as from a variety of thoroughly dried hydrogen-bearing solid feed materials including, but not limited to, carbonaceous materials, such as coal; wastes, including municipal solid waste (MSW), industrial waste and biomass; and other hydrogen-bearing starting materials. Moist starting materials require thorough drying in the disclosed PSFB cascade drier, using heated, compressed, very low relative humidity drying air supplied from a combustion turbine as disclosed here, or by similar means.

The overall objective of the present filing is to disclose both new inventions and improvements to previously disclosed apparatus, methods, processes and designs (i) for the purpose of thoroughly drying moist starting materials, such as coal, and (ii) for dissociating naturally dry and/or dried feed materials to manufacture and use a unique high-hydrogen, low-carbon synthetic gas mixture ("H-Syngas"). The perspective of the disclosed inventions, apparatus, methods, processes and designs is that the carbon in any feed materials is an undesirable by-product, and to the extent practical should remain unburned because of the negative environmental and economic consequences associated with carbon-dioxide ($CO_2$) emission and/or sequestering.

BACKGROUND OF THE INVENTION

Burning of Fossil Fuels—

Many believed that the burning of hydrocarbon-containing fossil fuels by humankind has contributed materially to global warming.[2] Life on Earth is part of the natural carbon cycle.[3] Plants have for millions of years combined chlorophyll, water and sunlight to convert atmospheric carbon in the form of carbon-dioxide ($CO_2$) into hydrocarbons and, along with geologic processes, have sequestered this carbon in various carbon-bearing deposits, e.g., coal seams. The burning of these carbon-rich deposits by humankind has in effect reversed in only a few hundred years the natural sequestrating of billions of tons of carbon that had occurred over tens of millions of years, materially altering the natural carbon cycle and the environment. The re-release of large quantities of sequestered carbon, specifically its release into the atmosphere as $CO_2$, has disturbed the global environment, and may be turning the Earth's environmental clock back to a time and to conditions that predate and could be hostile to the development of humankind.[4] $CO_2$ is one of a group of potent greenhouse gases.[5] Their release has contributed to recent changes (and is projected to contribute to undesirable future changes) in global temperature, weather and the carbon cycle; in other words the Greenhouse Effect.[6] To limit, and even reverse the effects of greenhouse gases on the planet, it is highly desirable for humankind to reduce, limit and perhaps even eliminate future releases of $CO_2$ into the environment.

That is why this disclosure seeks to promote method for hydrogen extraction from hydrogen-bearing materials which limit the production and release of $CO_2$, in order to minimize the release of carbon already sequestered in such deposits, and other starting materials. It is believed that the burning and capture, compression, storage, transport and re-sequestering of $CO_2$ is less desirable, and is likely to be less economical when all the external environmental risks and consequences are considered, and/or may prove to be technically, geologically, socially and/or politically infeasible for a wide range of applications.

The Hydrogen Economy—

In partial recognition of the negative effects of carbon release, some have called for the development of a hydrogen economy.[7] A number of different hydrogen economies may be envisioned using hydrogen in various ways. However, to achieve this vision of the hydrogen economy, there is a pressing need to find sources of hydrogen that do not also result in the release of substantial quantities of $CO_2$ into the environment.[8] To minimize the impact of the hydrogen economy on the environment, alternative safe, clean and environmentally acceptable sources of hydrogen, and processes for extracting hydrogen from those resources, must be developed and employed.

It is, therefore, an objective of the present inventions, apparatus, methods, processes and designs to present new inventions and improvements to previously disclosed inventions, apparatus, methods, processes and/or designs so as to produce "green hydrogen" from "black carbon" containing starting materials.

The environmental perspective of the disclosed inventions is that the carbon in any starting materials should be a by-product. The negative impact of $CO_2$ release on the environment makes it a by-product. It is envisioned that unburned carbon, substantially contained in the 3D3P step by-products, will be re-sequestered to minimize its release. For example, this may be accomplished by returning the processed carbon to the underground seam where the coal starting materials originally came from, perhaps in a vitreous form.[9] Other objectives and advantages will be more fully apparent from the following disclosure and appended claims.

SUMMARY OF THE INVENTION

Inventions, apparatus, methods, processes and designs are disclosed here for the thorough drying of moist starting materials, such as pulverized coal, and the production and use of a manufactured H-Syngas mixture derived from various dry and/or dried feed materials.

For moist starting materials, the drying air supply and drying steps are integrated (i) with the 3D3P step for the production of a unique high-hydrogen, low-carbon synthetic gas mixture (H-Syngas), and (ii) with a step for the use of H-Syngas to generate electricity and produce drying air. For naturally dry feed materials, the invention combines a 3D3P step for the production of H-Syngas with a step for the use of H-Syngas to generate electricity.

H-Syngas is produced during the 3D3P step by the plasma pyrolysis of certain hydrogen-bearing gases and liquids, such as natural gas and propane, from some oils, from dried pulverized coal and certain other dried starting materials. To produce this unique high-hydrogen, low-carbon H-Syngas mixture, all starting materials must either be naturally dry or be thoroughly dried. Removing water ($H_2O$) from moist starting materials before it is fed to the 3D3P step minimizes a major source of oxygen. The absence of oxygen during the 3D3P step limits the formation of undesirable carbon-based (and other unwanted by-product) gases, including the Greenhouse gases carbon-monoxide (CO) and carbon-dioxide ($CO_2$). Without thorough drying of moist starting materials, contained water would dissociate from the feed materials during the 3D3P step, releasing substantial amounts of reactive oxygen, leading to unacceptably high levels of by-product gases like CO and $CO_2$ in the H-Syngas mixture from an undesirable water-shift reaction.

Naturally dry gaseous feed materials, such as natural gas, may be fed directly into the 3D3P step. Where moist starting materials are used, they must first be thoroughly dried in a specialized cascade drier using large volumes of heated, compressed, very low relative humidity drying air sourced from bleed air ports on the low pressure stage of a combustion turbine. The dry and/or dried feed materials, e.g., natural gas and/or dried coal, are ultimately fed into a 3D3P Reactor or micro-reactor train to generate two streams:

(iii) a synthetic gas mixture substantially composed of hydrogen (H-Syngas), and (iv) a carbon and waste containing by-product, soot and/or slag stream.

H-Syngas may be used as an energy source in one or more high-temperature solid oxide (or other) fuel cells to generate electricity. Further, in the preferred embodiment, the remaining unconsumed H-Syngas is fed into and is burned in a combustion turbine to produce electricity, and, when moist starting materials are used, additional drying air for the specialized cascade driers. Liquid water, carbon black, slag-derived products, and process heat may also be saleable by-products from this 3D3P step.

DETAILED DESCRIPTION OF THE INVENTION

New and Improved Apparatus, Methods, Processes and Designs—

These inventions provide new and improved apparatus, methods, processes and designs (i) for the large-scale thorough drying of moist PSM where needed, (ii) for the manufacture of a unique H-Syngas mixture from various feed materials, and (iii) for specialized uses of H-Syngas as an energy source and fuel.

FIG. 1—Overview—

Figure 1:
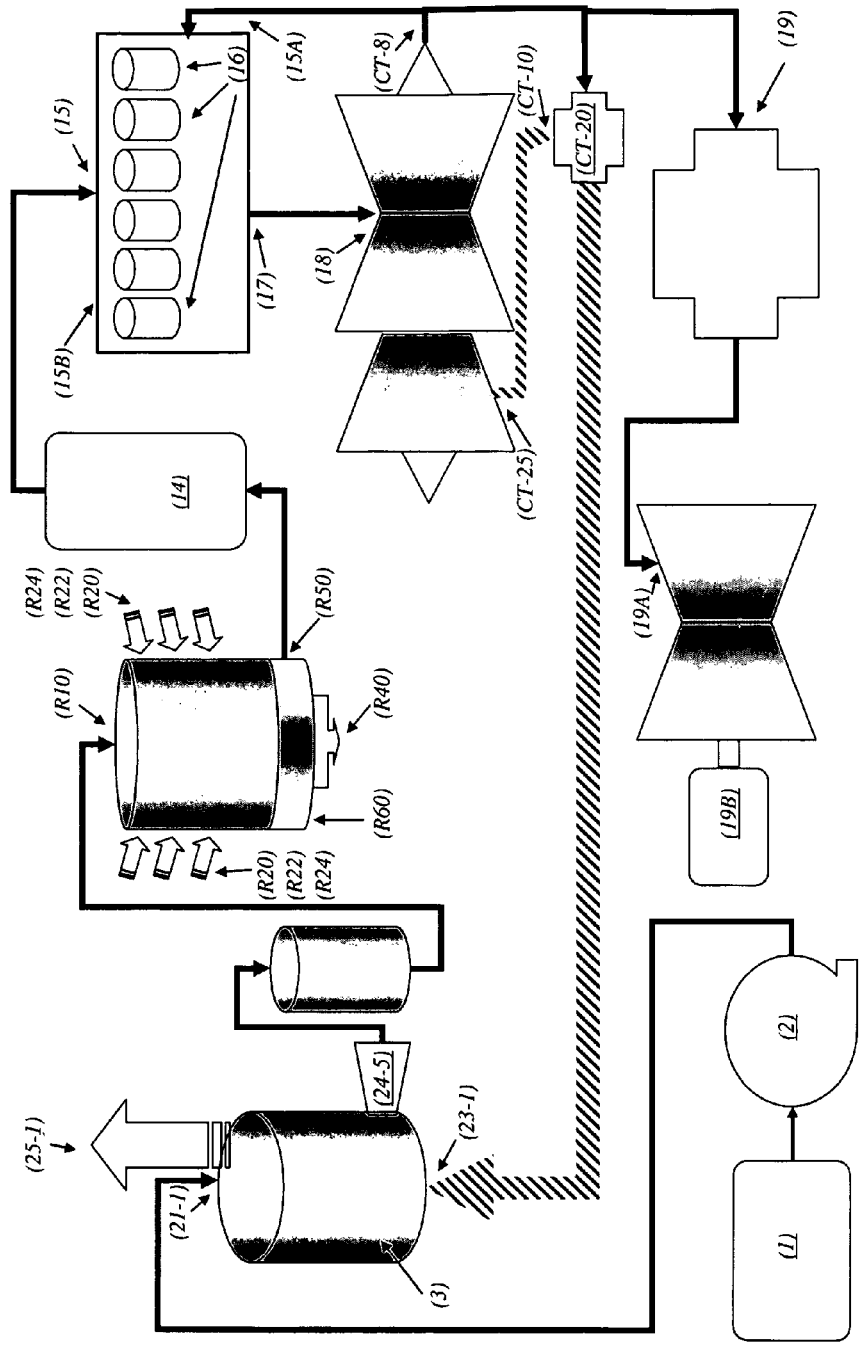
FIG. 1 contains the overall system diagrams associated with two different feed materials; coal (part 112) and natural gas (part 212).

Two overall process schematics are disclosed in FIG. 1. In the first schematic (part 112), moist coal at (1) is used as the starting material. It is pulverized into PSM at (11. This moist PSM is conveyed to the unique PSFB cascade drier al and injected at (211). Compressed air from the low pressure turbine bleed ports on a combustion turbine at (CT-25) is further heated by a portion of the turbine exhaust from (CT-8) directed to an air-to-air heat exchanger f CT-20). The drying air is then fed into the PSFB cascade drier columns (details omitted) starting at (23-1). This drying air rises through the PSFB drier (3), exiting at the top at (25-1). The dried PSM, pulverized coal here, exits from the bottom of the PSFB drier columns at (24-5) for treatment and temporary storage at L51, and then this dried feed material is transported to the 3D3P step (R60) at (RIO). Plasmas are injected into the 3D3P Reactor (R60) at (R20). Raw H-Syngas exits the 3D3P step at (R50). Carbon-containing slag exits the reactor at (R40). After gas processing at (14), the H-Syngas becomes an energy source for unique high temperature process-matched solid oxide fuel cells (PM-SOFCs) (16) entering the hot box at (15). The hydrogen contained in the H-Syngas combines in the PM-SOFCs with pre-heated oxygen in hot turbine exhaust from (CT-8) entering the hot box at (15A), producing electricity (hot box (15B) and PM-SOFC (16) details not shown). Remaining unutilized H-Syngas exits the PM-SOFCs (16) and hot box (15B) at (17), may be filtered and processed (not shown), and then is directed to a combustion turbine for use as a fuel at (18). The combustion turbine may be connected to a generator (not shown). The remaining hot exhaust gases emanating from the combustion turbine at (CT-8) may be directed to an air-to-water heat exchanger at (19) known as a heat recovery steam generator ("HRSG"). Steam from the HSRG turns a steam turbine at (19A), which steam turbine is connected to a generator (19B) to produce electricity.

In the second schematic (part 212), natural gas is used as the feed material. It is a naturally dry feed material and so it does not need to be dried prior to the 3D3P step (R60). Natural gas may be fed directly into the 3D3P Reactor fR60) at (R10) and may also be used as the plasma process gas at (R20), So, starting with the 3D3P step, a number of the same components may be used in part 212 as were identified in part 112. Natural gas is fed into the 3D3P step (R60) at (R10). Plasmas are injected into the 3D3P Reactor at (R20). H-Syngas exits the 3D3P step at (R50). Carbon soot exits the reactor at (R40). After optional gas processing at (14), the H-Syngas becomes an energy source for unique high temperature process-matched solid oxide fuel cells (PM-SOFCs) (16) entering the hot box (15B) at (15). The hydrogen contained in the H-Syngas combines in the PM-SOFCs with pre-heated oxygen in hot turbine exhaust from (CT-8) entering the hot box at (15A), producing electricity (hot box (15B) and PM-SOFC (16) details not shown). Remaining unutilized H-Syngas exits the PM-SOFCs (16) and hot box (15B) at (17), may be filtered and processed (not shown), and then is directed to a combustion turbine for use as a fuel at (18). The combustion turbine may be connected to a generator (not shown). The remaining hot exhaust gases emanating from the combustion turbine at (CT-8) are directed to a HRSG air-to-water heat exchanger at (19). Steam from the HSRG turns a steam turbine at (19A), which steam turbine is connected to a generator (19B) to produce electricity.

Figure 2:
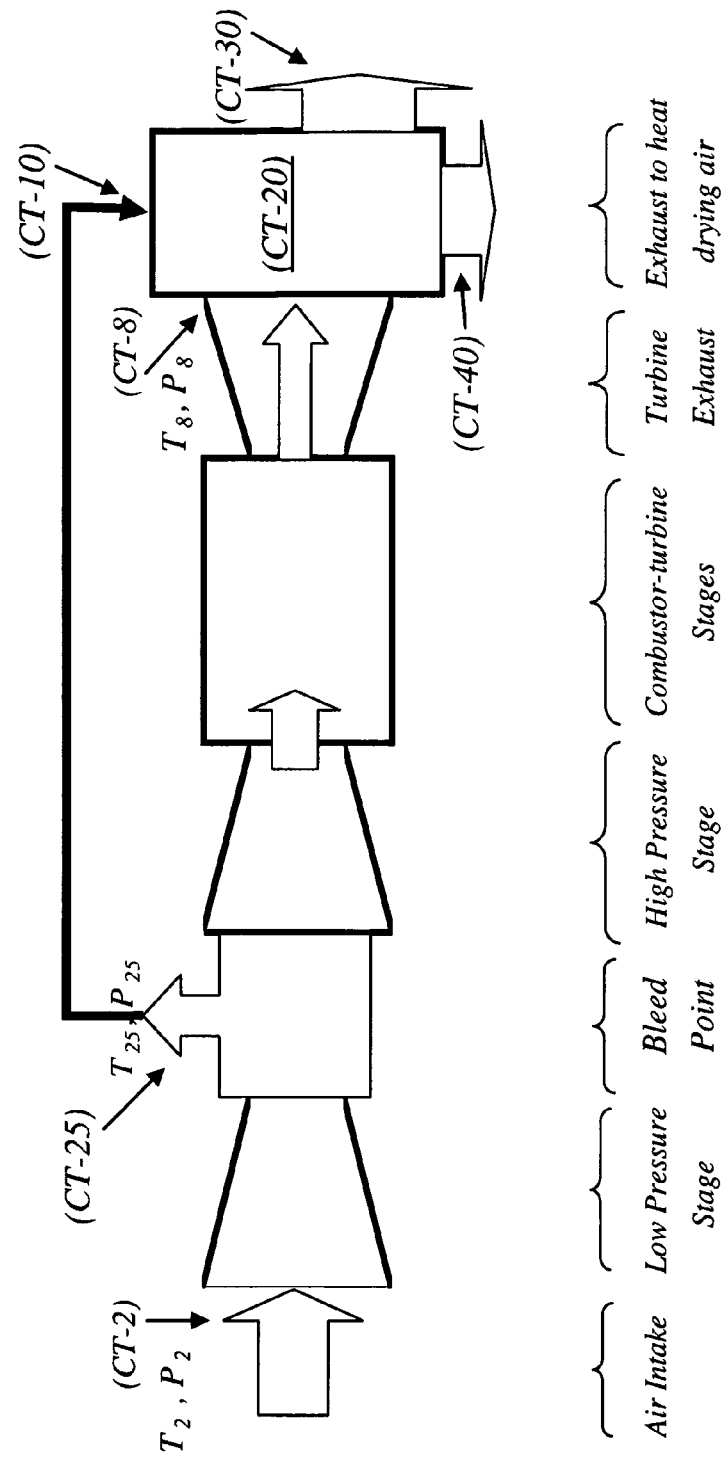
FIG. 2 is a schematic side view of the combustion turbine drying air supply source.

FIG. 2—CT-Heal and Air Supply—

The named inventions and methods disclosed are the use of a combustion turbine to provide:

(4) A high-volume of compressed, heated very low relative humidity drying air for drying moist PSM, such as pulverized coal, (5) A pre-heated oxygen supply for PM-SOFCs, and (6) A heat source for certain other specialized uses.

These are unique and non-obvious alternate uses of (i) compressed bleed-air from the low pressure (LP) compressor stage of a combustion turbine, and (ii) exhaust gases and exhaust heat. An oversized LP compressor may be used to provide air supply. Ambient air enters the LP compressor at (CT-2). The LP compressor increases both the pressure and temperature of the entering air and it is available to bleed off at (CT-25). This compressed air at (CT-10) is further heated by the combustion turbine exhaust from (CT-8) using an air-to-air heat exchanger at (CT-20). The result is a large volume of heated, compressed, very low relative humidity drying air at (CT-40) for the PSFB driers. The exhaust gases from (CT-8) heat the air-to-air heat exchanger at (CT-20) and also a HRSG at (CT-30) (not shown). Note that these drying steps are not required for naturally dry feed materials such as natural gas.

Three CT-sourced PM-SOFC pre-heated oxygen supply alternatives are also disclosed here:

(4) Partially oxygen-depleted CT exhaust gases from (CT-8) may be used directly as a pre-heated oxygen supply source for the PM-SOFCs, see FIG. 1 and FIG. 2 at (15A).[11]

(5) CT-sourced drying air supply from (CT-40), later exiting from the PSFB driers, may be mixed with and/or re-heated by CT exhaust gases from (CT-8) and be directed to the hot box of the PM-SOFCs for pre-heated oxygen supply, FIG. 1 and FIG. 2 at (15A) (illustration not shown).

(6) CT-sourced heated supply air from (CT-25) and/or (CT-40) may be sent directly to the hot box of the PM-SOFCs, and/or may be mixed with CT exhaust gases from (CT-8), to provide a pre-heated oxygen supply for the PM-SOFCs, FIG. 1 and FIG. 2 at (15A) (illustration not shown).

Finally, exhaust gases from the CT may be used to pre-heat the process gas, Carrier Gas and feed materials, e.g., natural gas and PSM, such as pulverized coal, prior to the 3D3P step (illustrations not shown). Other arrangements with similar objective and intent are also possible, and are within the scope of the claims disclosed here.

Figure 3:
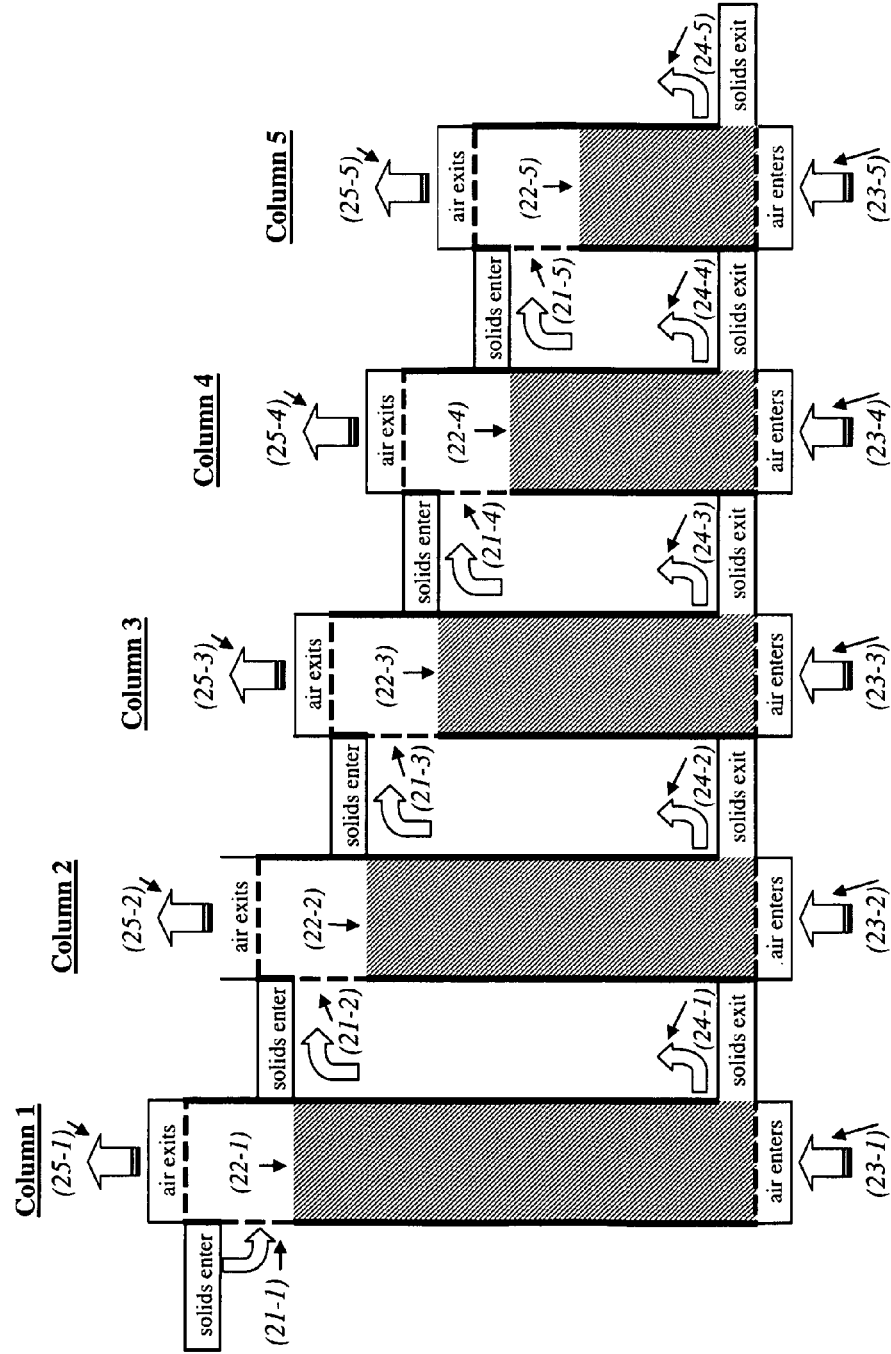
FIG. 3 is a schematic side view of the disclosed parallel-series fluidized bed ("PSFB") cascade drier for moist starting materials using a multi-column cascade.

FIG. 3—Parallel-Series Fluidized Bed Cascade Drier—

The named invention and method disclosed is referred to as the parallel-series fluidized bed (PSFB) cascade drier. The named process is the large-scale, thorough drying of moist starting materials, such as pulverized coal, using the named invention for extracting as much moisture as is reasonably achievable. The preferred embodiment discloses the unique purpose and use of a parallel-series arrangement of multiple fluidized bed drier columns, assembled into a series-flow of solid particle cascades, each with a counter-current heated, compressed drying air flow. The specific design of the PSFB will be dictated by the process objectives, the drying source(s) and the starting materials to be dried. (The drying air supply method disclosed in and/or the PSFB cascade drier invention disclosed in may also be used for drying other materials, including, but not limited to, food products, such as corn and tea, and for drying other moist solids.) The design and use of fluidized bed driers is well understood by those skilled in the art.

5-Column PSFB Drier—

FIG. 3 contains a five (5) column parallel-series fluidized bed (PSFB) cascade drier using a plug, counter-flow design for the thorough drying of moist starting materials. A moist starting material, in this figure moist pulverized coal, is introduced into the top of Column 1 at (21-1) where it falls to the top of the fluidized bed at (22-1). The solid particles move downward under the influence of gravity, partially offset by the fluidizing motion of the rising drying air. An agitator or stirring mechanism (not shown) may also be utilized to mix the solid particles for improved, more uniform drying. The drier solid particles move to the bottom of the column where they are drawn off at (24-1) for delivery to and input into the next column at (21-2) (and likewise for each column). Heated, compressed drying air from the combustion turbine enters the column through an air-flow control grate at the bottom at (23-1). The air-flow control grate manages the distribution and flow rate of entering drying air to process parameters. The drying air rises propelled by the pressure supplied by the LP turbine compressor, but is restrained somewhat by friction between the rising drying air and the falling solid particles in the column (the shaded area below (22-1)). The drying air rises to the top of the fluidized bed within the column to (22-1) and then to the top of the column where it exits the column through filters (not shown) at (25-1). The exiting moisture laden air at (25-1) may be recycled for use in fuel cells, a combustion turbine, sent to a supplemental-firing combustor ahead of a heat-recovery steam generator (HRSG) in a combined cycle unit design, the water condensed out of it and/or it may be expelled to the atmosphere after treatment. (This process and description is repeated for each column, 1 through 5, referring to labels X-1, X-2, X-3, X-4 and X-5, where "X" may be valued 21 through 25, respectively, for columns 1 through 5, and having the same meaning as used above for column 1.) Finally, the dried PSM exit the PSFB drier cascade from column 5 at (24-5) for further processing, storage and ultimately use of this dried feed material in the 3D3P step.

FIG. 4, FIG. 5, FIG. 6 and FIG. 7—

A plasma reacting region ("PRR") may be formed using different means. The 3-dimensional 3D3P plasma pyrolysis process uses one or more of various PRR forming devices. A 3D3P plasma-powered thermal reactor (e.g., the 3D3P Reactor) may be formed using one or more of these disclosed plasma forming devices. Several PRR forming devices are disclosed below. Other configurations with similar purpose and intent also fall within the scope of the claimed inventions.

Plasma Sheet, Array and Cylinder—

Figure 4:
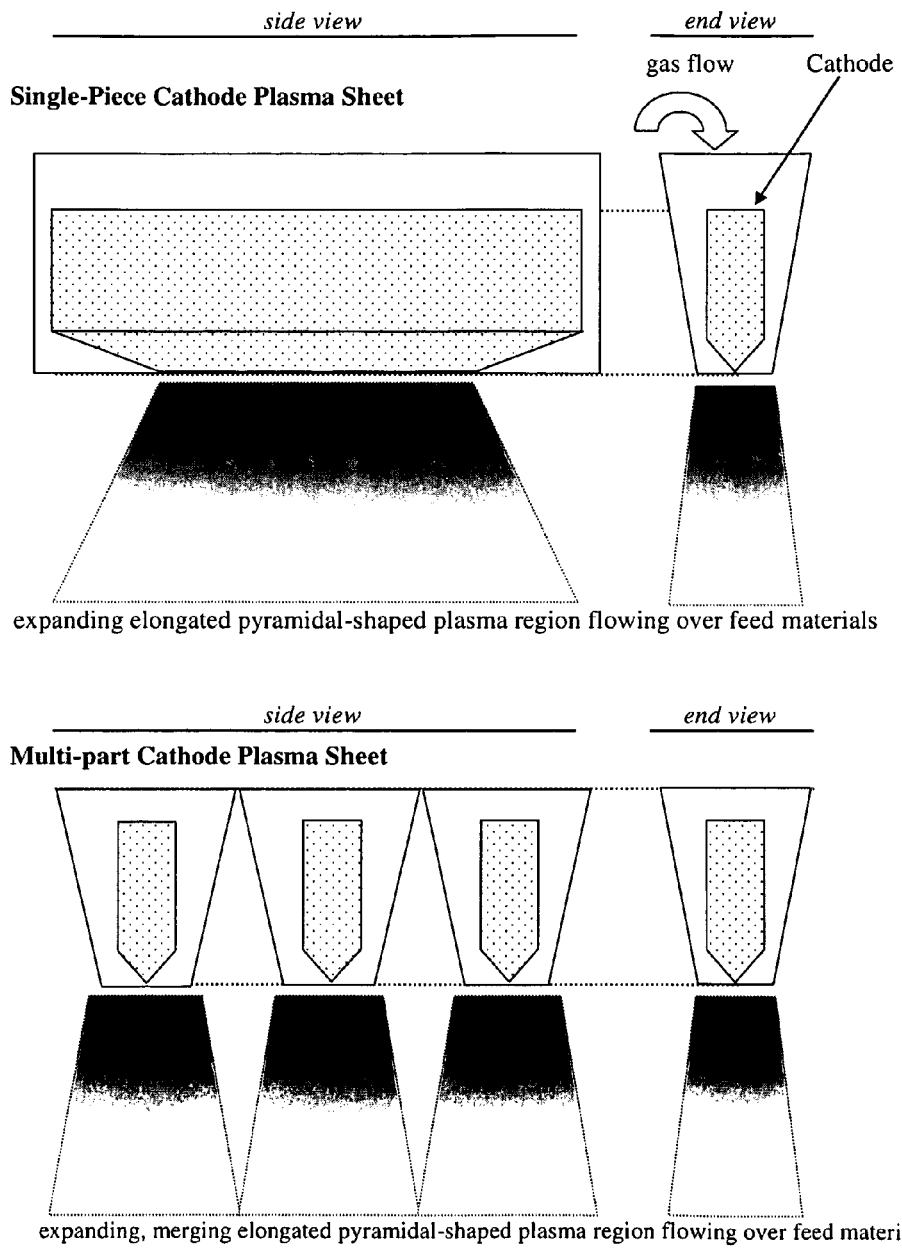
FIG. 4 contains an overview schematic of a plasma sheet (part 112), and a plasma array (part 212).
Figure 5:
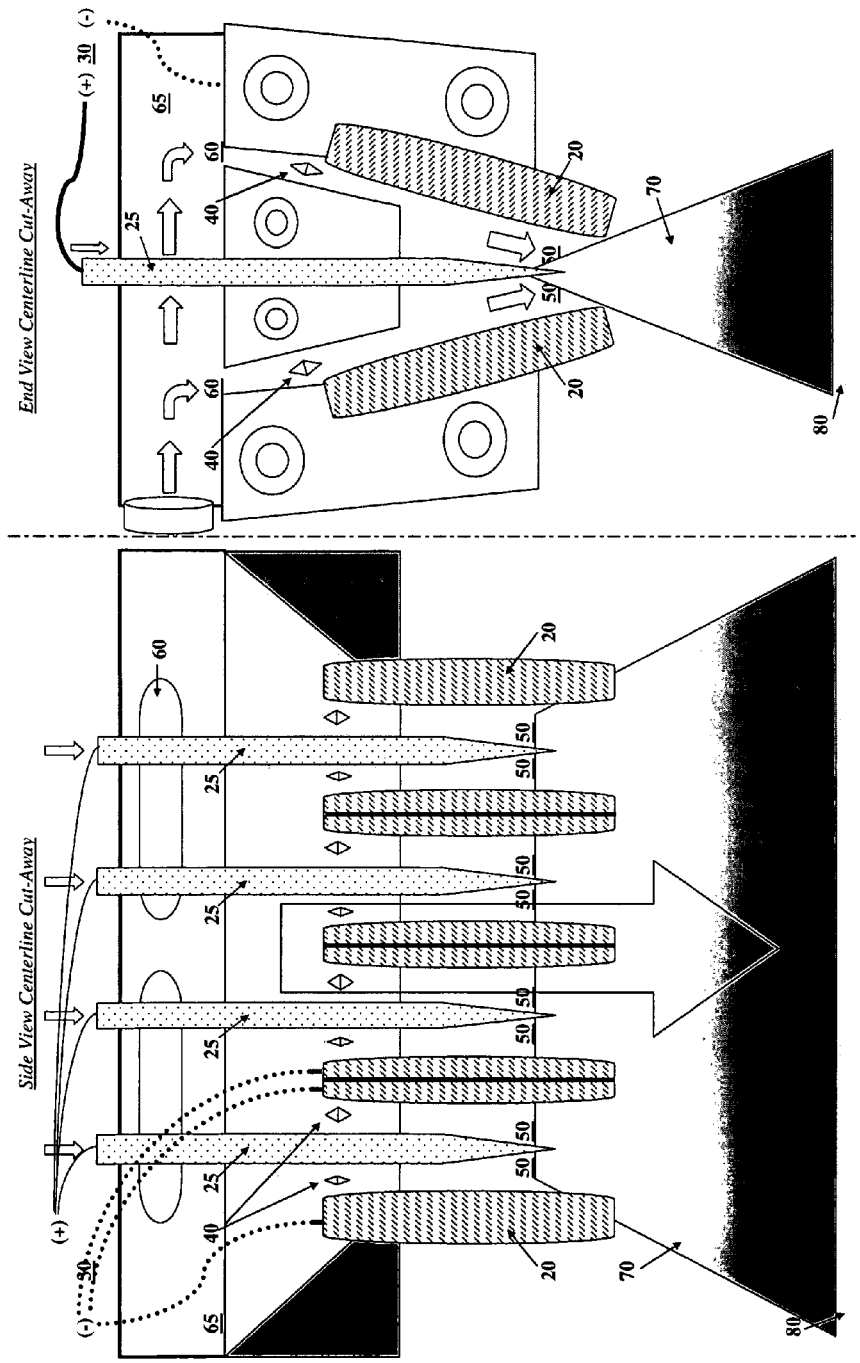
FIG. 5 contains detailed front and side cut-section views of a plasma sheet.
Figure 7:
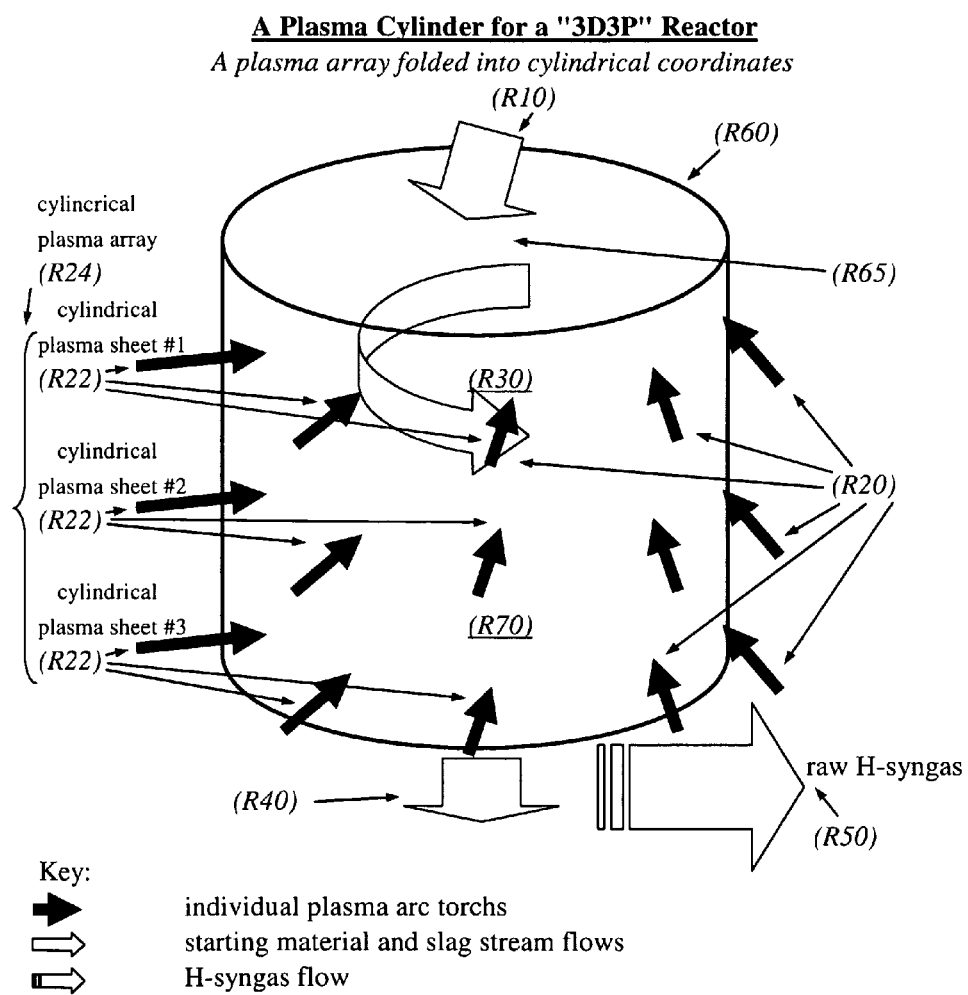
FIG. 7 contains a schematic side view of the disclosed plasma cylinder (for the 3D3P Reactor), which is a plasma array (made up of plasma sheets) translated into cylindrical coordinates.

A plasma sheet may be formed from a series of plasma arcs (or from a 2-dimensional straight or curved line apex). In any case, the plasma widens into a 3-dimensional, elongated, pyramidal PRR (see FIG. 4, part 112). It is this elongated pyramidal volumetric PRR which improves reactor throughput and efficiency for the large-scale and/or more complete conversion of feed materials. A plasma array may be formed from 2-dimensional flat, curved or folded plasma sheets which when layered create a large 3-dimensional PRR (FIG. 4, part 212). The plasma cylinder may be formed from a plasma array made of plasma sheets folded or translated into cylindrical coordinates (FIG. 7). This creates a columnar 3-dimensional PRR. Many different arrangements are possible. All these larger 3-dimensional PRRs allow for longer reacting times, higher material throughput rates and/or more uniform and complete reaction of materials than is attainable with other designs.

Forming a Plasma Sheet—

The plasma sheet disclosed may be formed from a series of cathodes and anodes in various arrangements. A multi-arc design involves a row or grouping of separate plasma arcs, whereby the row or grouping of individual conical-shaped PRRs overlap and merge into a single larger elongated pyramidal reacting region (or alternatively these plasmas may just touch or may be spaced apart, depending on the particular design required). In any case, their irradiative fields substantially overlap. This description will refer to the multi-part plasma sheet in FIG. 5, but will generally apply to all designs with similar purpose, including elongated electrode and similar multi-arc designs. The objective of the device is to produce a larger 3-dimensional PRR in order to accommodate the larger mass-flow rates, longer reacting times and/or more uniform and complete reaction of feed materials required for the large-volume processing of dry feed materials.

The disclosed 3D3P step and 3D3P Reactor are designed to produce a large volume of H-Syngas and by-products, the latter containing substantial quantities of carbon. This by-product carbon may be fashioned into manufactured carbon, consumable electrodes. These electrodes in FIG. 5 at (20) and (25) are supported mechanically by insulating structures (not shown) and connected electrically to a power supply at (30) (not shown), whose design and use is well understood by those skilled in the art. As electrons and atoms oblate from the surface of the electrodes, this material will need to be replaced periodically. Either stationary or advancing electrode designs may be used. The embodiment contained in FIG. 5 contemplates an advancing electrode design. As the electrode is consumed by the process, the electrode is fed down into the holder by mechanisms not shown, but whose design and use is well understood by those skilled in the art. The electrical arc at (0.1Q) through and ionizing the process gas is formed between the two electrodes (20) and (25). (Other electrode designs and arrangements are also possible.) The process gas at (0), in this case H-Syngas substantially containing hydrogen, is introduced into a plenum above the plasma sheet support assembly at ((ID. Natural gas, nitrogen and other gases may also be used. The gas flows down into orifices (not shown) leading to the pre-ionization area at (40) where the gas is partially ionized improving its conductivity. From there the gas flows down into the electrical arc, plasma formation region at (50). Electrons flowing through the electrical arc at (not shown) heat the process gas dissociating it into atoms and then the atoms into their electron and proton-nuclei constituents. The electrical arc raises the temperature of the resulting PRR to the process design temperature. The overall process design and specifically the plasma temperature at (70) is a function of a number of parameters, including, but not limited to, the composition and flow-rate of the feed materials, the physical design of the reactor, the process objectives and the desired H-Syngas mixture composition.[12, 13, 14] The temperature sought for the dissociating feed materials at (80) will be a key factor in determining the plasma sheet design and plasma temperature used. The process should seek to maximize hydrogen production, while avoiding the unintended vaporization or production of undesirable chemical species.[15]

Forming a Plasma Array—

A plasma array may be formed from two or more plasma sheets. It may also be formed by a perforated sheet of plasma arcs (FIG. 4, part 212). A plasma array is used to form a larger 3-dimensional PRR with both greater width and depth. The advantages of these larger PRRs include:

increased reaction time, which results in more complete reactions, the ability to maintain a more uniform temperature above a minimum threshold, and the ability to handle higher feed material throughput rates, while maintaining the overall H-Syngas production process objectives.

Figure 6:
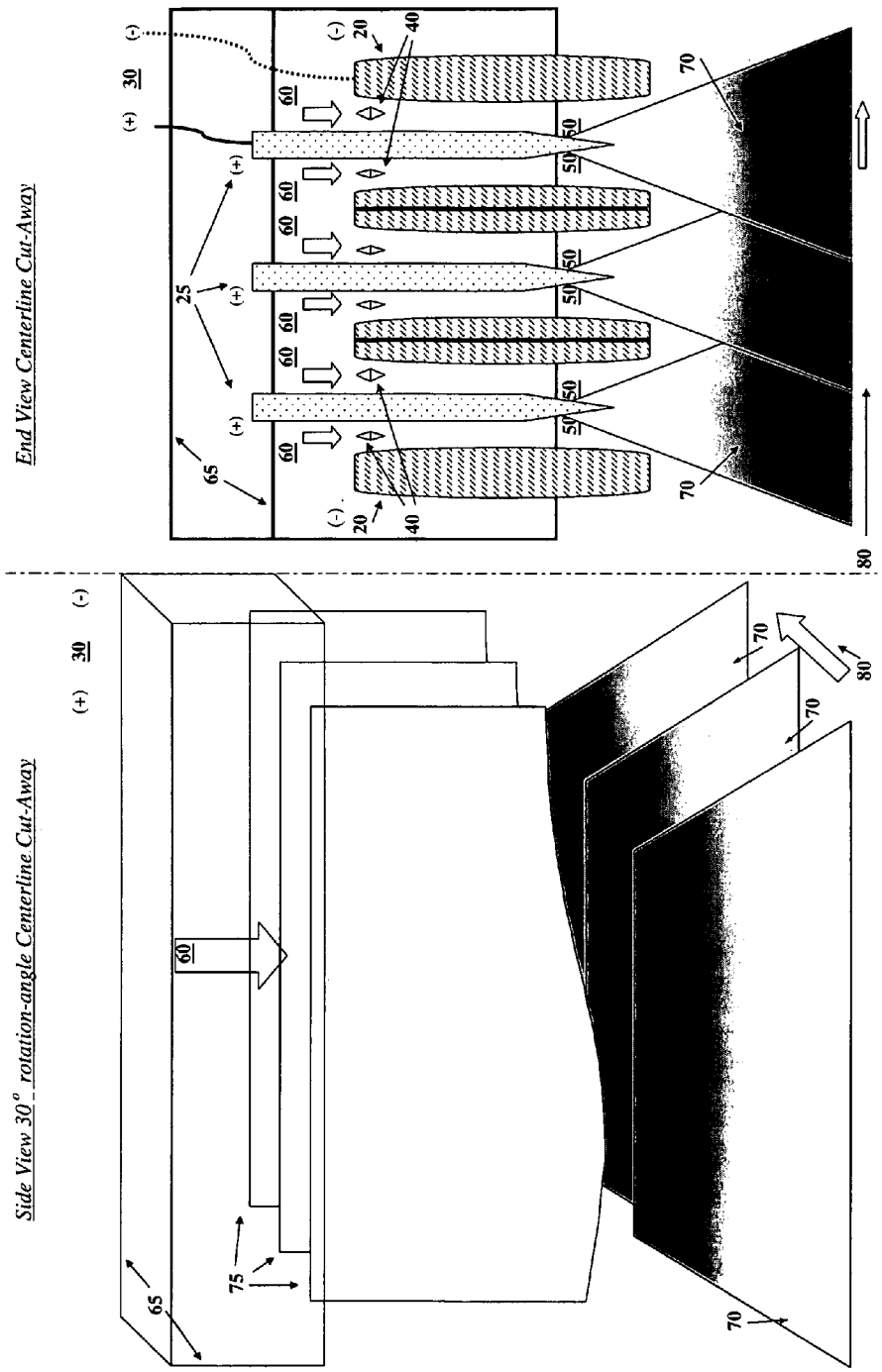
FIG. 6 contains detailed front and side cut-section views of a plasma array.

This description will refer to the multi-sheet plasma array disclosed in FIG. 6, but will generally apply to all designs with similar purpose, including elongated and multi-arc designs. The objective of the device is to produce an even larger PRR in order to accommodate the larger mass-flow rates and/or longer reacting times required for the large-volume uniform processing of feed materials.

In this embodiment, the plasma array in FIG. 6 is constructed of three plasma sheets at (75) (details omitted). Other similar designs and arrangements are also possible. Electrodes at (20) and (25) are supported mechanically by insulating structures (not shown) and connected electrically to a power supply at (30) (not shown), whose design and use is well understood by those skilled in the art. As atoms oblate from the surface of the electrodes, this material will need to be replaced periodically. Either stationary or advancing electrode designs may be used. The embodiment contained in FIG. 6 contemplates an advancing electrode design. As the electrode is consumed by the process, the electrode is fed down into the holder by mechanisms not shown, but whose design and use is well understood by those skilled in the art. The electrical arc through and ionizing the process gas is formed between the two electrodes (20) and (25). (Other electrode designs and arrangements are also possible.) The process gas at (60), in this case H-Syngas, is introduced into a plenum above the plasma array support assembly at (u). Natural gas, nitrogen and other gases may also be used. The gas flows down into orifices (not shown) leading to the pre-ionization area at (40) (incompletely shown) where the process gas is partially ionized improving its conductivity. From there the gas flows down into the electrical arc, plasma formation region at (50). Electrons flowing through the electrical arc at (50) (not shown) heat the process gas dissociating it into atoms and then the atoms into their electron and proton-nuclei constituents. The electrical arc raises the temperature of the resulting PRR to its process design temperature. The overall process design and specifically the plasma temperature at (70) is a function of a number of parameters, including, but not limited to, the composition and flow-rate of the feed materials, the physical design of the reactor, the process objectives and the desired H-Syngas mixture, composition. The temperature sought for the dissociating feed materials at (80) will be a key factor in determining the plasma array design and plasma temperature used. The process should seek to maximize hydrogen production and use, while avoiding the unintended vaporization or production of undesirable chemical species in the H-Syngas mix.

Figure 8:
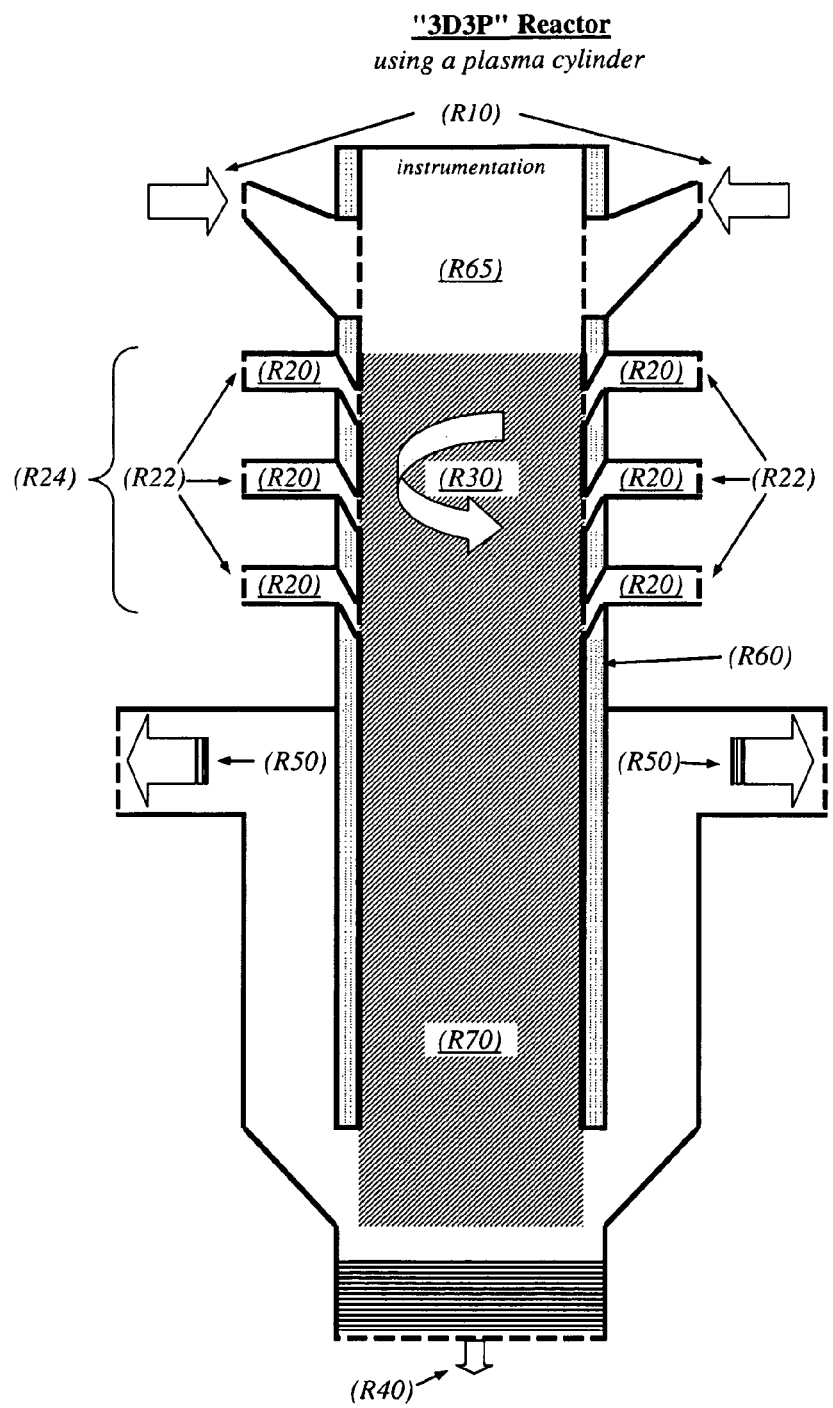
FIG. 8 contains a schematic side cut-section view of the disclosed 3D3P Reactor using a plasma cylinder.

FIG. 7 and FIG. 8—The Plasma Cylinder and 3D3P Reactor

The Plasma Cylinder—

The plasma cylinder disclosed in FIG. 7 is a plasma array wrapped into cylindrical coordinates to form a columnar inward-pointing PRR. Plasma cylinders may use straight-flow or angled vortex-flow. In straight flow in-falling feed materials pass straight through the plasma-heated reacting region of the plasma reactor or micro-reactor. In the vortex-flow design, the plasma jets may be angled so as to create a tornado-like vortex for the plasma injected into the reactor. The vortex at (R30) may be used to create a longer, cylindrical path length for materials falling within the 3D3P Reactor (or micro-reactor train) to increase residence time for feed materials, like pulverized coal. In this embodiment, the disclosed plasma cylinder at (R24) is formed from multiple cylindrical horizontal plasma sheets at (R22), made up of individual angled plasma arcs (R20). Other configurations with similar purpose and intent also fall with the scope of the claimed inventions.

The 3D3P Reactor—

For the 3-dimensional plasma pyrolysis process reactor (3D3P Reactor) disclosed here in this vertical cross-cut view (FIG. 8), feed materials at (R10) are introduced at the top of the reactor at (R65). Individual angled plasma arcs at (R20) form cylindrical horizontal plasma sheets at (R22). These cylindrical horizontal plasma sheets are stacked so as to form the 3-dimensional cylindrical plasma array (R24) and the columnar PRR of the plasma cylinder at (R30). Sheets and/or individual plasma arcs may be arrayed either in an aligned or staggered arrangement. Angling of both the plasmas injected and the feed materials as they are injected into the reactor may also be used to form an elongated cylindrical, downward-spiraling vortex path at (R30) through the 3D3P Reactor (R60), lengthening the reaction path and, therefore, the time falling feed materials are exposed to the PRR of the 3D3P Reactor (R60)—in FIG. 8, the shaded region from the area surrounding (R30) through the area surrounding (R70). The by-product carbon soot or slag stream collects and then exits the reactor at the bottom at (R40). The desired raw high-hydrogen, low-carbon H-Syngas mixture is drawn off from the column at (R50) and is directed to the gas clean-up system (not shown). The design of gas clean-up systems is well understood by those skilled in the art.

Single Plasma Arc Torch is Less Desirable—

A single plasma arc torch produces a near zero-dimensional or point source. The plasma forms an intense narrow focal heat source with a narrow PRR, its apex formed at the plasma arc. This narrow plasma may be acceptable for spot welding or plasma cutting. However, these narrow plasma designs concentrate all their heating into a small region, proving to be less efficient, inefficient or unworkable, when applied singly or in pairs to the large-scale extraction of H-Syngas from large volumes of feed material, as is contemplated here in the 3D3P Reactor.

FIG. 9 through FIG. 16—Micro-Reactor Train for Generating H-Syngas and Electricity Overall Process—

Figure 9:
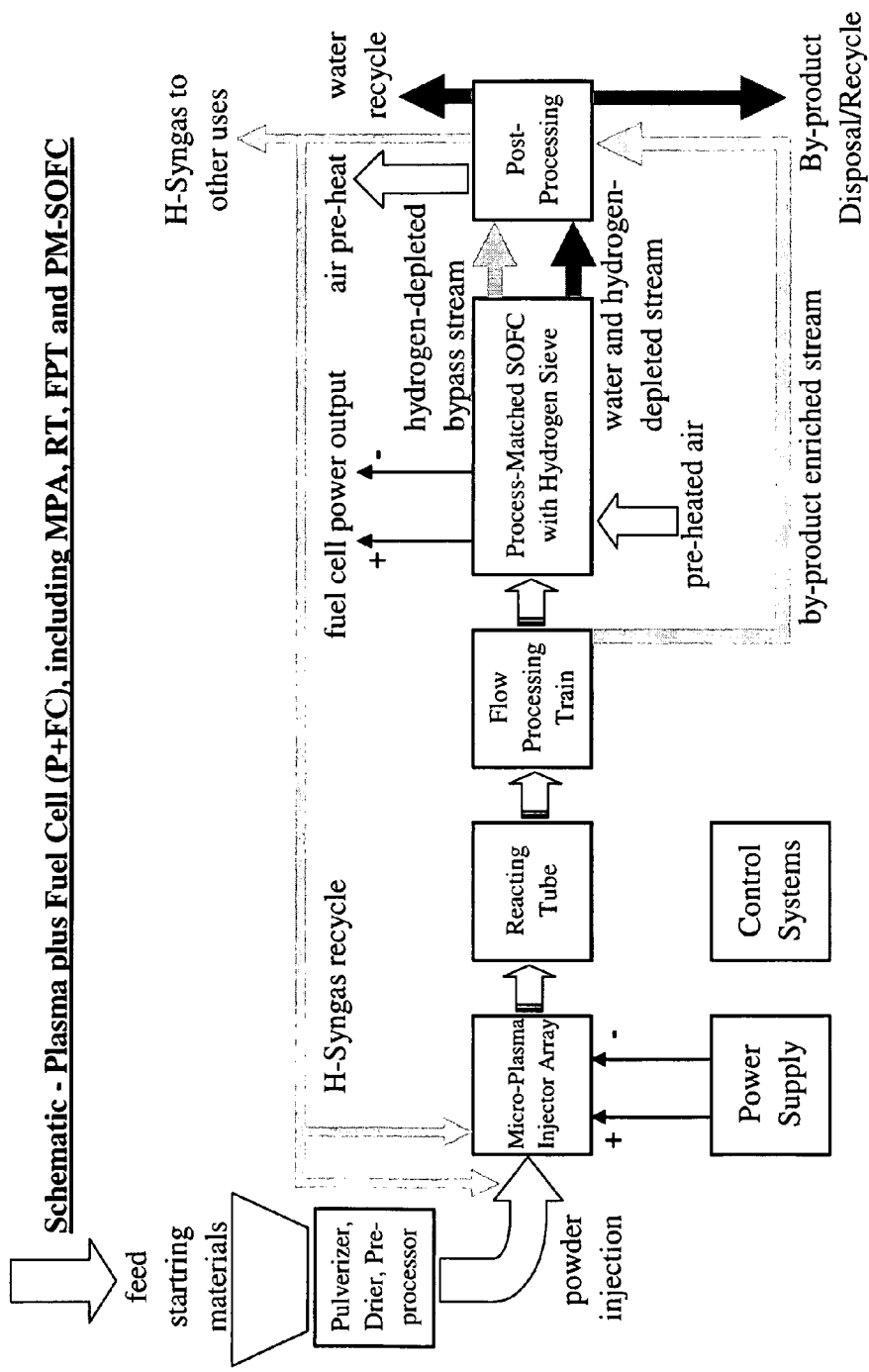
FIG. 9 contains the Overall Process Schematic Diagram for the disclosed micro-reactor train.

FIG. 9 discloses the overall micro-reactor train and process. In this figure, pulverized or powdered, dried feed materials, along with process gas are delivered to a micro-plasma injector array (MPA) which injects hot plasma and feed materials into a reacting tube (RT) creating a PRR. Several injectors of each kind may be used. Natural gas, many oils and/or other dry feed materials may also be used. As the plasma transfers energy to the feed material, heating it rapidly, H-Syngas is formed from the contained hydrocarbons (and other hydrogen sources). The rapidly reacting mixture can complete its dissociation reaction in about one second. The hot multi-phase mixture then flows into a flow processing train (FPT). If employed, two streams emerge from the FPT, one enriched in H-Syngas, and the other depleted in H-Syngas, but enriched in solids and by-products. The H-Syngas enriched stream may then flow to one or more process-matched solid oxide fuel cells (PM-SOFC) (or other fuel cells) where hydrogen is drawn off from the H-Syngas stream. Hydrogen from the H-Syngas and oxygen from the pre-heated oxygen supply combine within the PM-SOFC to form water vapor and electricity. The remaining partially hydrogen-depleted H-Syngas is sent to processing, and may be used as a fuel in a combustion turbine to produce more drying air, electricity and/or for other uses. The by-products of the PM-SOFC and the combustion turbine are water vapor and heat. Both may be recycled for other uses.

Single Train P+FC—

Figure 10:
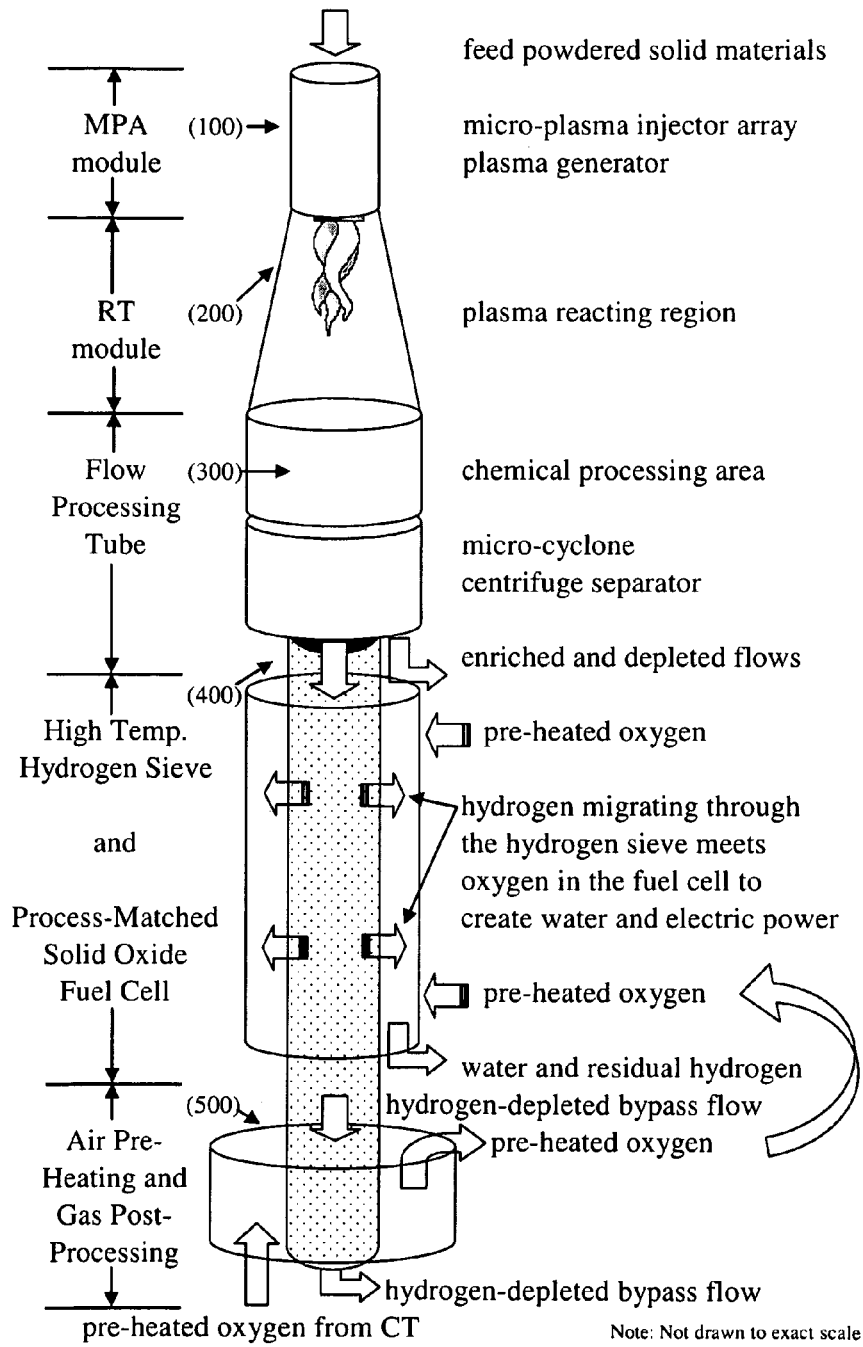
FIG. 10 contains a drawing of the Single Train P+FC, plasma plus fuel cell(s) micro-reactor train using dried PSM as a feed material.

FIG. 10 discloses a single, combined plasma and fuel cell train (Single Train P+FC). In this figure, dried powdered or pulverized solid feed material known as dried PSM is fed into a micro-plasma injector array assembly at (100) (also see MPA, FIG. 13 and FIG. 14). Feed gases, such as natural gas, and some oils may also be used (see below). For PSM, the feed materials are flashed to a multi-phase mixture of volatiles and solids in the plasma Reacting Tube (RT) at (200). The mixture enters the FPT at (300) for further processing and separation in the micro-cyclone region, where solids are thrown to the outside of the device by centrifugal forces, while the H-Syngas migrates toward the center. The H-Syngas may be further processed within the FPT (also see FIG. 15 at 310), depending on the specific requirements of the overall process. The FPT in this figure contains a micro-cyclone centrifuge separator (MCCS) (also see FIG. 15 at 330), spinning the mixture around in a vortex. Two streams emerge from the MCCS. The one toward the center is relatively enriched in H-Syngas, and the other at the periphery is relatively depleted in H-Syngas, but enriched in heavier solids and by-products. The H-Syngas enriched stream flows to a process-matched solid oxide fuel cell (PM-SOFC) at (400). In FIG. 10 at (400), the H-Syngas passes through the interior of the PM-SOFC and the contained hydrogen migrates across the Hydrogen Sieve and into contact with the anode. Hydrogen from the H-Syngas and oxygen from the pre-heated oxygen supply combine within the PM-SOFC, forming water vapor and electricity. The Hydrogen Sieve acts as a non-hydrogen barrier. It keeps any residual solids, by-products and undesirable gases away from direct contact with the anode, limiting the negative impacts of such interactions. Further, this Hydrogen Sieve (also see FIG. 16 at (410)) prevents water vapor created by the PM-SOFC from coming into contact and reacting with any carbon in the H-Syngas stream (also see FIG. 16 at (400)). In FIG. 10, pre-heated oxygen in a gas mixture (e.g., turbine exhaust or recycled from the PSFB cascade drier), is introduced into the PM- SOFC. Any remaining hot H-Syngas may first be sent to support oxygen supply pre-heating, and then along with residual solids, by-products and undesirable gases, is sent to post-processing at (500) (not shown). The entering oxygen supply is pre-heated, e.g., by exiting hot H-Syngas, to improve the overall efficiency of the PM-SOFC. In this case, any hydrogen remaining in the partially hydrogen-depleted H-Syngas stream is ultimately directed to a combustion turbine to support the production of more drying air and to generate electricity.

Single Train P+FC—

Figure 11:
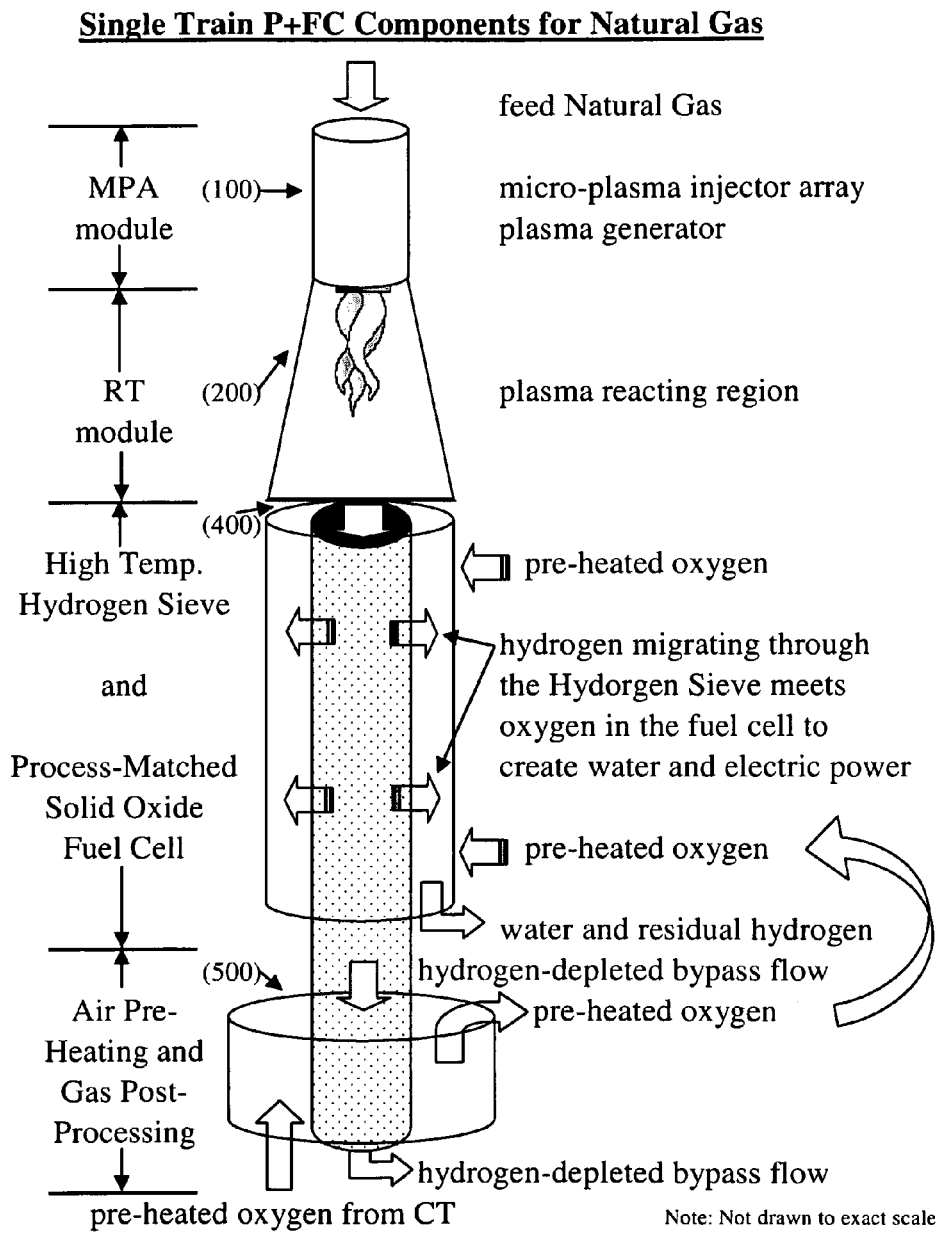
FIG. 11 contains a drawing of the Single Train P+FC, plasma plus fuel cell(s) micro-reactor train using natural gas as a feed material.

FIG. 11 discloses a single, combined plasma and fuel cell train (Single Train P+FC) using natural gas as both the process gas and the feed material. In this figure, natural gas is fed into a micro-plasma injector array (MPA) assembly at (100). The natural gas feed gas mixes with the natural gas-based plasma and becomes a multi-phase mixture in the plasma Reacting Tube (RT) at (200). For natural gas, the feed material is converted into a heated, flowing plasma-gas mixture largely composed of hydrogen and carbon atoms, ions and electrons. The mixture enters the process-matched solid oxide fuel cell (PM-SOFC) at (400). In this figure, the H-Syngas passes through the interior and the contained hydrogen migrates across the Hydrogen Sieve and into contact with the anode. The Hydrogen Sieve acts as a non-hydrogen barrier. It keeps carbon soot particles and any by-products and undesirable gases away from direct contact with the anode, limiting the negative impacts of such interactions. Further, this Hydrogen Sieve (also see FIG. 16 at (410)) prevents water vapor created by the PM-SOFC from coming into contact and reacting with any carbon in the H-Syngas stream (also see FIG. 16 at (400)). Hydrogen from the H-Syngas and oxygen from the pre-heated oxygen supply combine within the PM-SOFC, forming water vapor and electricity. Any remaining hydrogen-depleted H-Syngas, e.g., residual hydrogen, carbon, and any by-products and undesirable gases, may first be sent to support oxygen supply pre-heating and then to post-processing at (500) (not shown). The entering oxygen supply is pre-heated, e.g., by exiting hot H-Syngas, to improve the overall efficiency of the PM-SOFC. In this case, any hydrogen remaining in the partially hydrogen-depleted H-Syngas stream is ultimately directed to a combustion turbine to generate additional electricity.

Split Train P+FC—

Figure 12:
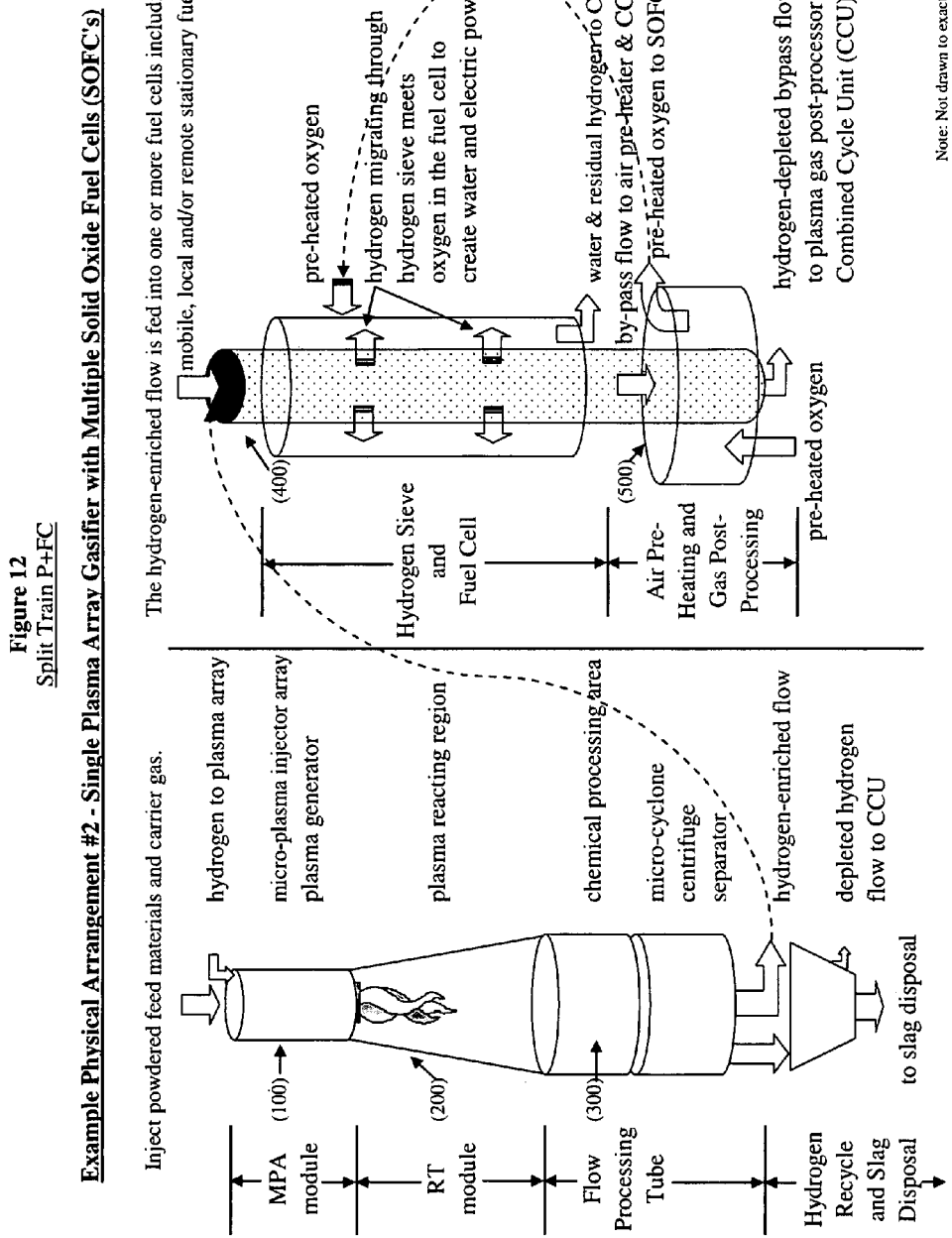
FIG. 12 contains a drawing of the Split Train P+FC, plasma plus (mobile, local and/or remote) fuel cell(s) micro-reactor train.

FIG. 12 discloses a split plasma and (mobile, local and/or remote) fuel cell train (Split Train P+FC). H-Syngas is formed, processed and stored temporarily at one location and is then piped or transported to another location where it may be stored and is then consumed by one or more fuel cells and/or other devices. Its purpose and components are similar to the Single Train P+FC designs in FIG. 10 and FIG. 11, i.e., MPA at (100), RT at (200), FPT at (300), the PM-SOFC and/or other fuel cells and/or combustion devices at (400) and post-processing at (500). Several different arrangements with a similar purpose are possible. Other configurations with similar purpose and intent also fall with the scope of the claimed inventions.

Micro-Plasma Injector Array and RT—

Figure 13:
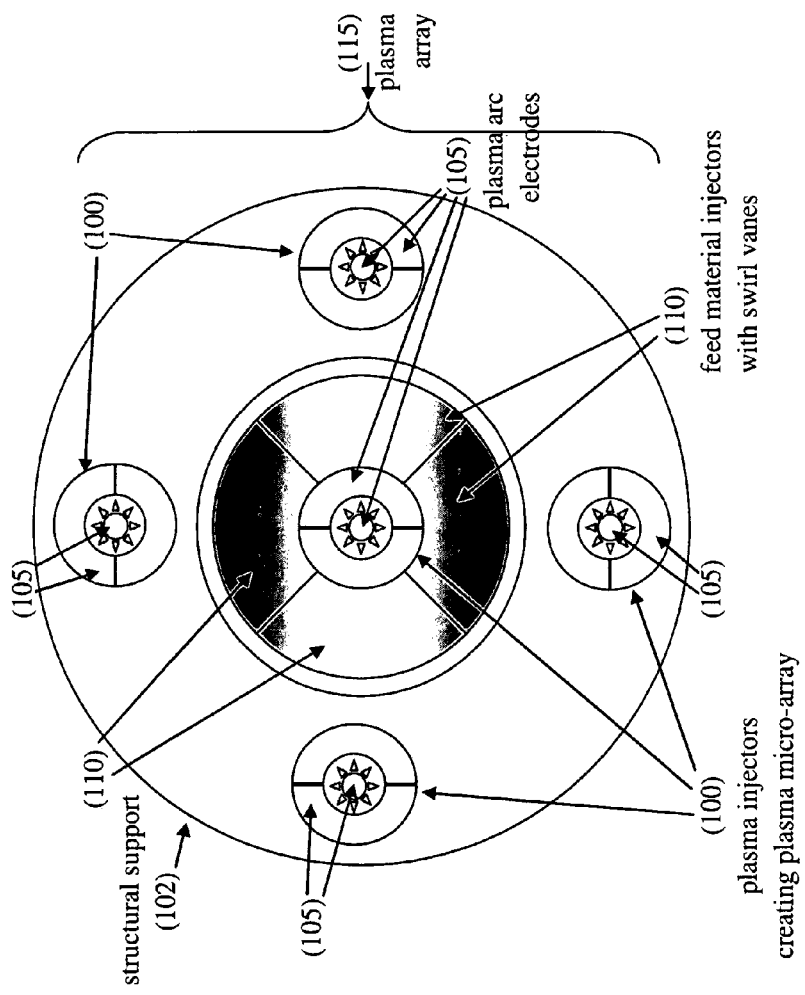
FIG. 13 and FIG. 14 contain drawings of the disclosed Micro-Plasma Injector Array (MPA) with plasma and feed material injector(s) and the plasma reacting region (PRR) in the Reacting Tube (RT).
Figure 14:
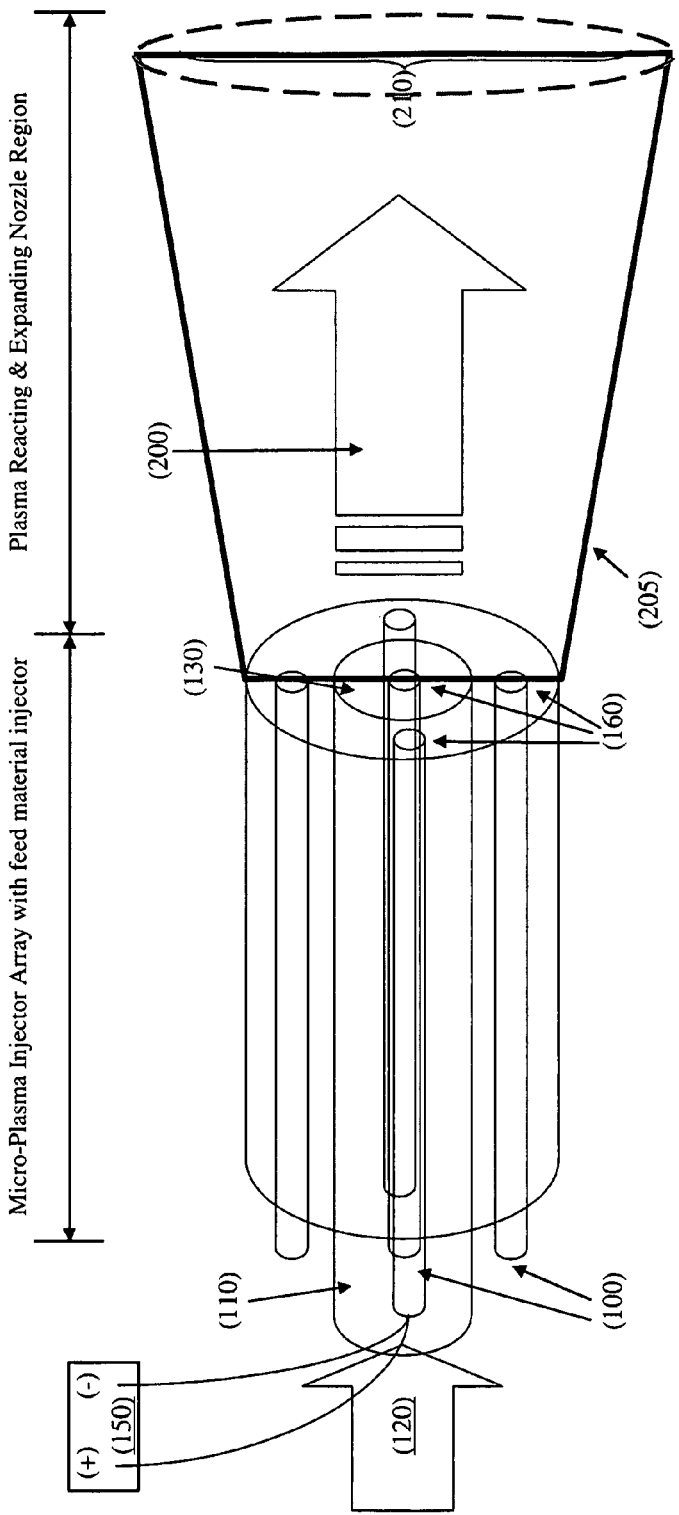

FIG. 13 and FIG. 14 disclose certain details of the micro-reactor train which is a combination device made up of several sections. FIG. 13 is a cross-section view of the micro-plasma injector array (MPA) for injecting hot plasmas at (100) and feed materials at (110). In this embodiment, individual plasma arcs are held by a support structure (102). Each of these five (5) plasma arcs is formed between two electrodes (105) which together form a micro-plasma array (115). Together with the feed material injectors at (110) they form the MPA. FIG. 14 is a see-through view which includes the MPA for injecting hot plasmas at (100) and feed materials at (110 and 120) into a Reacting Tube (RT) (205) for dissociation and the extraction of hydrogen to form H-Syngas. The design may use several of each kind including either straight and/or angled injectors for the micro-plasma at (100), and feed materials at (110 and 120), depending on the specific requirements of the 3D3P step. In FIG. 14, five (5) micro-plasma arcs at (100) form a plasma array at (160) integral with four carrier gas-blown PSM feed material injectors at (130) (details omitted), which together form key parts of the MPA. The design and use of gas-blown solid delivery systems is well understood by those skilled in the art. These figures assume the use of PSM. However, natural gas may also be used as a process gas and as a feed material. When brought together, the micro-plasmas and feed materials form a hot mixture of flowing gases and solids in a spiraling, expanding reacting vortex flow at (200) within the RT (205). It exits the RT at (210). The micro-plasmas are powered by power supplies (details not shown) at (150).

If natural gas is used as the process and feed gas, it may be fed into the MPA at (100) for the pyrolysis process. Natural gas is also fed into the Reacting Tube (RT) (205) from (110 and 120) for dissociation and the extraction of hydrogen to form H-Syngas. When brought together, the micro-plasmas and feed natural gas form a hot mixture of flowing gases, ions, electrons and carbon soot particles in a spiraling, expanding reacting vortex flow at (200) within the RT (205). It exits the RT at (210). The micro-plasmas are powered by power supplies (not shown) at (150).

Flow Processing Train—

Figure 15:
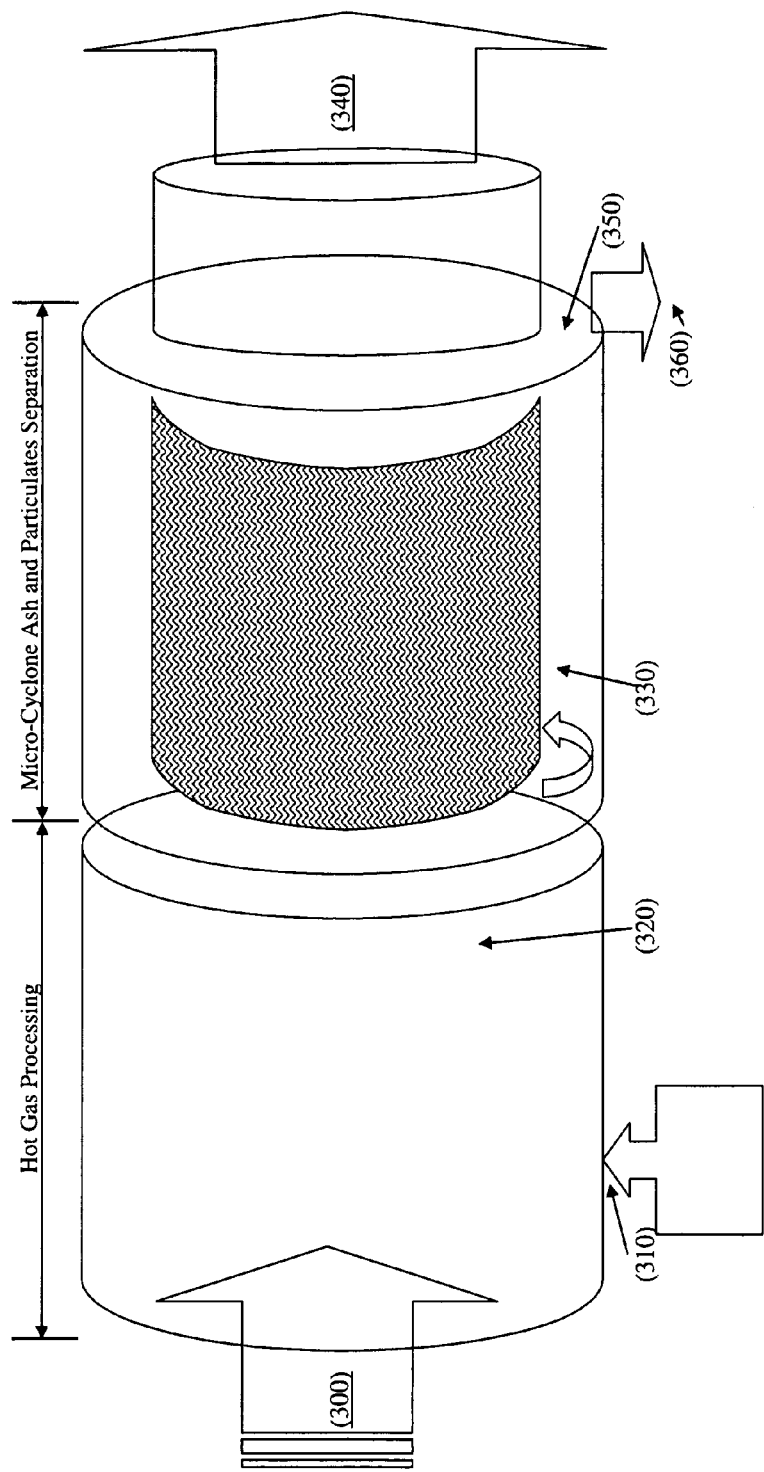
FIG. 15 contains a drawing of the flow processing train (FPT), also disclosed with the micro-reactor train.

FIG. 15 also discloses the flow processing train (FPT). If the FTP is required, raw H-Syngas and solids enter the FPT at (300). Chemicals may be added to react with the flow mixture at (310). They react with the hot plasma-gas mixture in the reacting region at (320). The flow mix enters a micro-cyclone centrifuge separator (MCCS) at (330) for separating solids entrained in the flow. Two streams are drawn off, one at the center is enriched in H-Syngas at (340), and a second at the walls is relatively depleted in H-Syngas, but enriched in solids and exits the train at (350) for further processing at (360) (not shown).

Figure 16:
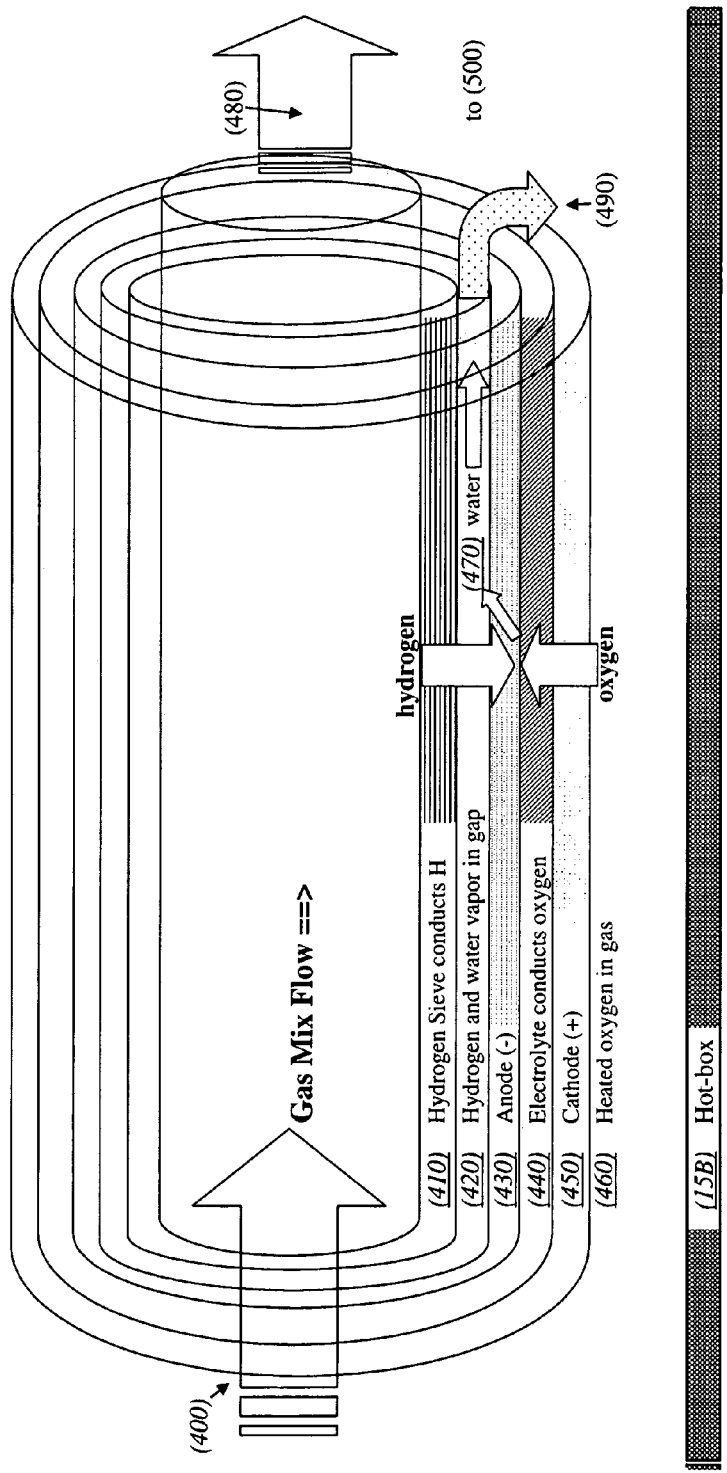
FIG. 16 contains three drawings of the disclosed Process-Matched Solid Oxide Fuel Cell with an integral Hydrogen Sieve (PM-SOFC).
Figure 16:
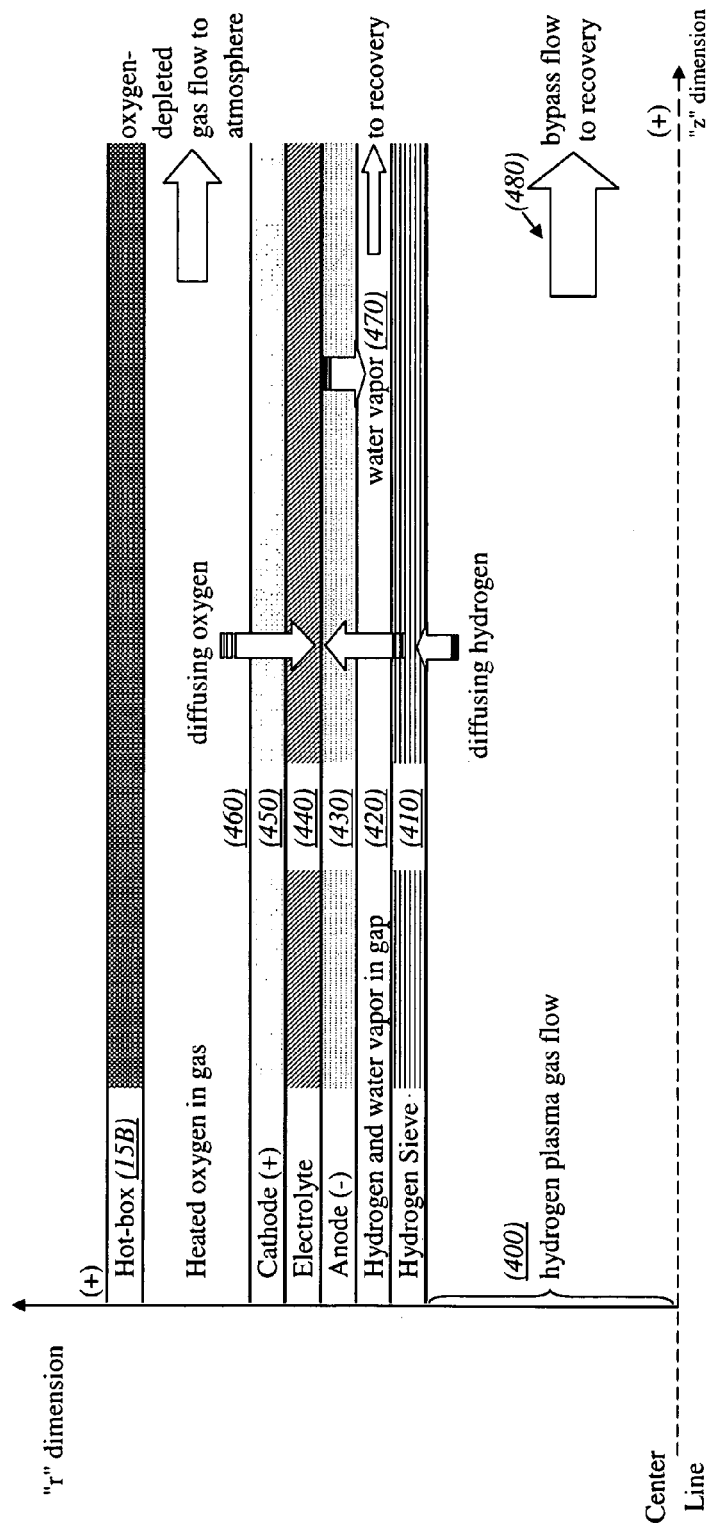
Figure 16:
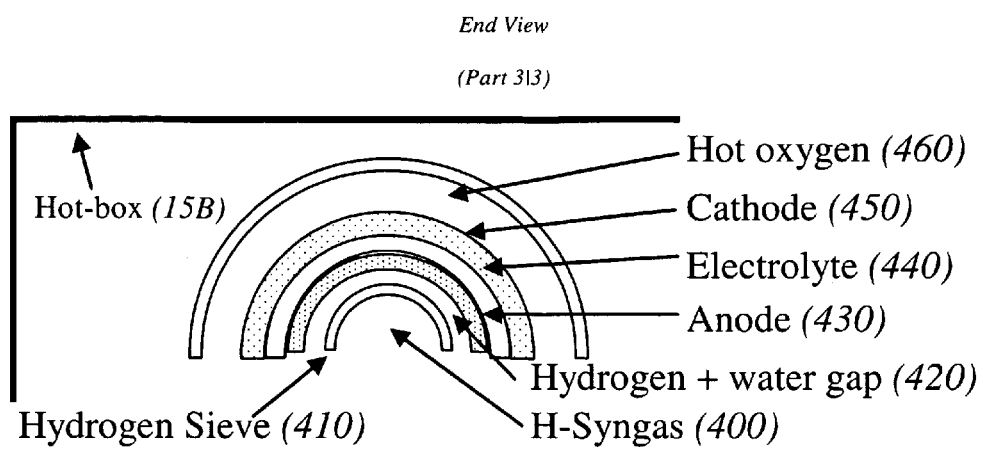

FIG. 16—PM-SOFC with Hydrogen Sieve

Process-Matched Solid Oxide Fuel Cell—

FIG. 16 shows 3 drawings of a new and novel high temperature process-matched solid oxide fuel cell with Hydrogen Sieve (PM-SOFC). The disclosed PM-SOFC is a unique anode-in (430) and cathode-out (450) device specifically designed to accommodate the Hydrogen Sieve (410) and the entering hot H-Syngas flow at (400) from the 3D3P step. H-Syngas flows down the center of the PM-SOFC. A pre-heated oxygen supply surrounds the PM-SOFC. Other arrangements may also be possible. However, the disclosed arrangement uniquely meets the overall process objectives. In the preferred embodiment, hydrogen from the hot H-Syngas flow at (400) migrates outward through the Hydrogen Sieve at (410), across the gap at (420), and through the anode at (430). There the hydrogen meets and reacts with inward-migrating oxygen from the pre-heated oxygen supply at (460) to form water ($H_2O$) and electricity at the interface between the anode (430) and the electrolyte (440). The water molecules formed then migrate inward through the anode (430) and into the gap (420) provided for outward migrating hydrogen and inward migrating water molecules at (470), between the Hydrogen Sieve and the anode. The Hydrogen Sieve also prevents water vapor at (470) from coming in contact with any carbon in the H-Syngas flow at (400), thereby preventing an undesirable water-shift reaction and formation of the Greenhouse gases CO and $CO_2$. The direction of the net flow within the gap (420) flushes water vapor at (470) and some hydrogen down the length of the PM-SOFC and eventually out of the PM-SOFC to gas processing at (490) (not shown). In any case, some hydrogen remains in the partially hydrogen-depleted H-Syngas as it exits the PM-SOFC at (480) and then proceeds to gas processing at (500) (not shown), and ultimately to other uses. The PM-SOFC is typically surrounded by a hot box (15B). Other configurations with similar purpose and intent also fall with the scope of the claimed inventions.

Hydrogen Sieve—

FIG. 16 discloses the use of a Hydrogen Sieve at (410) as part of the PM-SOFC. The new and novel purpose of this Hydrogen Sieve at (410) is to promote the flow of hydrogen from the H-Syngas stream at (400) and into contact with the anode of the PM-SOFC, while blocking the migration of water vapor from (470) into the H-Syngas stream at (400). The Hydrogen Sieve at (410) allows hydrogen to cross it preferentially, while simultaneously preventing the transmission of water vapor at (470)—as well as entrained solids and other gaseous species in the H-Syngas at (400)—across the barrier formed by the Hydrogen Sieve. This preferential transmittal of hydrogen limits the negative impacts of unwanted solids, as well as the corrosive impacts of harmful chemical species at (400), on fuel cell operating life and efficiency. The Hydrogen Sieve at (410) also prevents water vapor at (470) from coming into contact with any carbon in the H-Syngas flow at (400), thereby preventing an undesirable water-shift reaction and formation of the Greenhouse gases CO and $CO_2$. In order to accomplish these objectives, the Hydrogen Sieve is made up of a lattice of bound atoms with sufficiently small yet porous channels so as to allow for the free flow of hydrogen through the Hydrogen Sieve, while blocking the flow of other large molecules, such as water and carbon. Other configurations with similar purpose and intent also fall within the scope of the claimed invention.

End View—

FIG. 16 part 313 provides a half shell, cross-cut end view of the PM-SOFC. The notations here have the same meaning and purpose as those referenced in parts 113 and 213.

Figure 17:
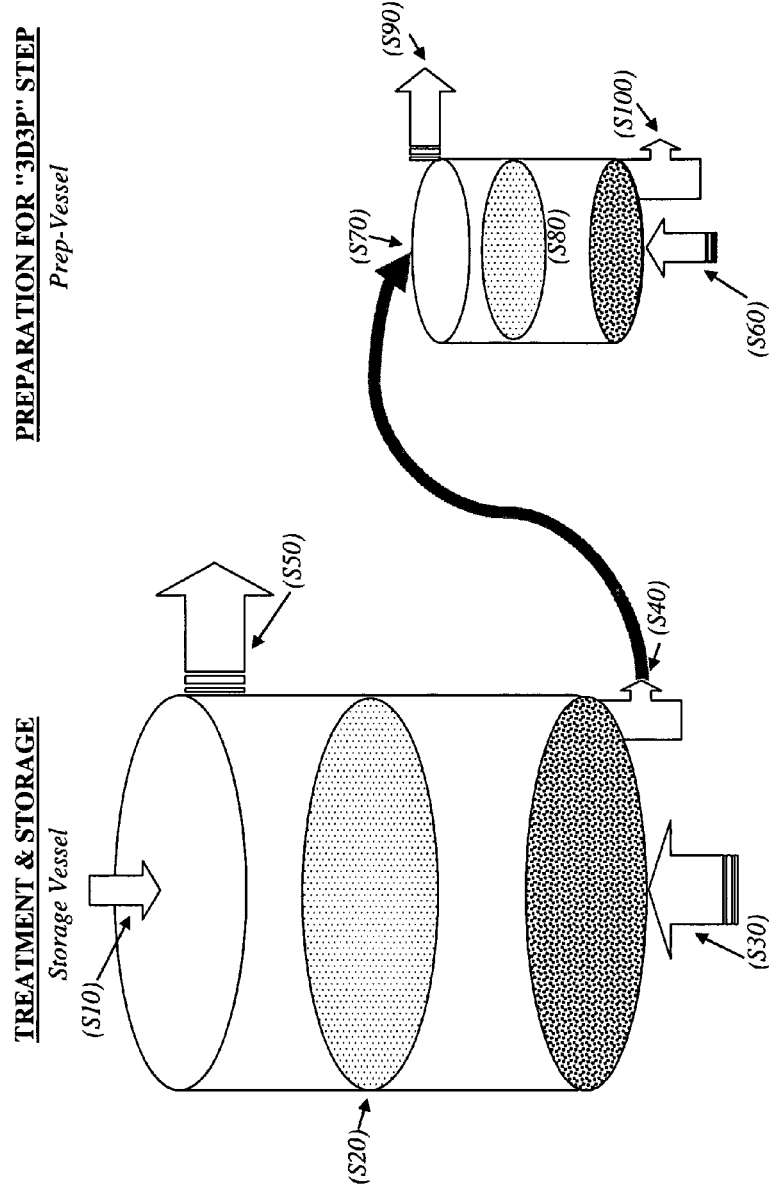
FIG. 17 contains drawings of neutralizing and preparatory gas treatments and devices for the replacement of drying air, removal of residual water, fire suppression, for preparation for storage, heating of process gas, carrier gas and feed materials and use of PSM prior to the 3D3P step.

FIG. 17—Neutralizing and Preparatory Gases, Treatment and Storage Vessels, Treatment, Storage and Preparation FIG. 17 discloses the use of:
4. A neutralizing covering gas (e.g., dry nitrogen),
5. A preparatory carrier gas (e.g., H-Syngas) for PSM handling, and
6. Special-purpose treatment, storage, pre-heating and preparation vessels, all for the treatment, storage, pre-heating and preparation of dried pulverized solid materials (PSM), such as coal, as may be supplied by a PSFB cascade drier or other means, prior to a 3D3P step. The purpose of these gas treatments and preparation and storage vessels is:
(f) Covering Gas Flush—To flush out entrained oxygen in air from the PSM (following the PSFB cascade drier step) for storage prior to the application of carrier gas and the 3D3P step;
(g) Covering Gas Temperature Control—To heat or cool the dried PSM to the desired storage temperature;
(h) Covering Gas Fire Suppression—To suppress any spontaneous or other combustion in the stored PSM by displacing oxygen;
(i) Carrier Gas Substitution—To substitute a solid material handling carrier gas for the covering storage gas in the PSM prior to the 3D3P step; and
(j) Pre-heating—Carrier Gas pre-heating may be used to prepare PSM for the 3D3P step. Pre-heated Carrier Gas and PSM require less plasma power to volatilize contained hydrocarbons than is required when they are cold.

In FIG. 17 dried PSM enters the top of the Treatment & Storage Vessel at (S/O). The PSM falls to the top of the storage pile at (S20). Covering gas enters the vessel at the bottom (S30) and flushes drying air from the PSM pile and into the plenum above the pile, above (S20). An agitator or stirring device (not shown) may be employed. The drying air is flushed out of the top of the vessel at (S50). Dried de-oxygenated PSM is withdrawn from the bottom of the vessel at (S40) and is transferred to the Prep-Vessel where it enters at (S70). The PSM falls to the top of the prep-pile. Carrier gas is forced into the bottom of the Prep-Vessel at (S60). The pre-heated Carrier Gas heats the PSM and flushes the Covering Gas from the PSM at (S80) and the Covering Gas above the prep-pile, above (S80), exits the Prep-Vessel at (S90). An agitator or stirring device (not shown) may be employed. The pre-heated PSM and Carrier Gas mixture is withdrawn from the bottom of the Prep-Vessel at (S/00). The amounts of Covering Gas and Carrier Gas, the extent of any pre-heating, and the size of the Treatment & Storage Vessel and Prep-Vessel will depend on the quantity and type of PSM to be processed. The covering gas flushes entrained oxygen and some residual water vapor from the PSM. The addition of pre-heated Carrier Gas to the PSM in the Prep-Vessel assists with handling of the PSM, with the formation of plasmas and reduces the formation of the unwanted Greenhouse gases carbon-monoxide (CO) and carbon-dioxide ($CO_2$) in the 3D3P step. When needed by the 3D3P step, Carrier Gas and PSM may be withdrawn from the storage vessel at (S100). Other configurations with similar purpose and intent also fall within the scope of the claimed inventions.

Figure 18:
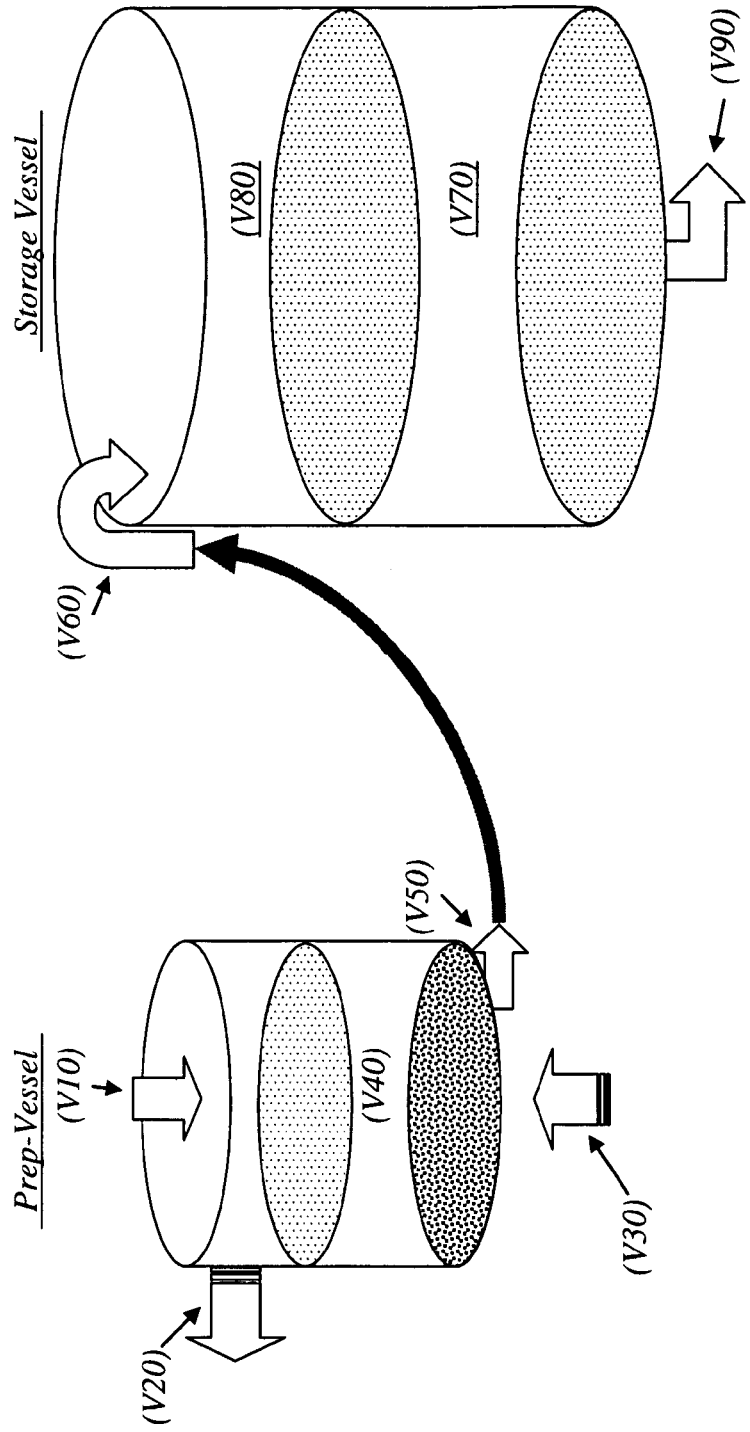
FIG. 18 contains drawings of the vacuum-gas replacement (VGR) methodology and devices for replacement of drying air, removal of residual water, fire suppression, for preparation for storage, heating of process gas, carrier gas and feed materials and use of PSM prior to the 3D3P step.

FIG. 18—Vacuum-Gas Replacement Methodology and Devices

Disclosed in FIG. 18 is the preferred embodiment of the vacuum-gas replacement ("VGR") methodology and devices. VGR may be used to supplement or as an alternative to the methods and devices disclosed in FIG. 11.

The VGR methodology and devices for PSM are designed to:
(g) Reduce oxygen surrounding the PSM by evacuating the drying air,
(h) Remove residual oxygen contained in PSM by reducing the vessel pressure,
(i) Remove water vapor and liquid water from the PSM by reducing the vessel pressure,
(j) Prepare the PSM for storage and pre-heating (heating not shown),
(k) Promote fire suppression in the PSM, and
(l) Prepare PSM for the 3D3P step.

In FIG. 18 PSM enter the "prep-vessel" in its normal (e.g., atmospheric) pressure mode at (V10) and fall to the bottom of the prep-vessel to the PSM pile at (V40). The prep-vessel is then sealed as this batch process embodiment starts. A continuous process design may also be used. The drying air and water vapor mixed with the PSM are pumped out of the prep-vessel by a vacuum pump or other similar means at (V20). The prep-vessel then remains sealed and the pump(s) maintain the vacuum for a period of time (the "soak") determined by the specific process design objectives, such as desired final moisture content and limits on the remaining entrained oxygen for the PSM. An agitator or other stirring mechanism (not shown) may be employed. Such vacuum drying and evacuation methods and designs are well understood by those skilled in the art.

Following completion of the soak period, the prep-vessel is returned to normal (e.g., atmospheric) pressure by flooding it with a gas acting as either or both a covering and/or a carrier gas at (V30). This gas replaces the evacuated drying air and residual water vapor in the regions interstitial to the PSM particles and within pores in the surface and volume of the PSM. Following this gas replacement stage, PSM may be drawn off from the prep-vessel at (V50) for transfer to a storage vessel entering at (V60). PSM accumulate in a pile at the bottom of the storage vessel at f V70).

Pre-heated Carrier Gas may be circulated through the storage vessel (heating not shown). Pre-heated Carrier Gas and PSM require lower plasma power (e.g., to volatilize hydrocarbons) than is required when they are cold. The Carrier Gas may also accumulate above the PSM at (V80). When needed by the 3D3P step, Carrier Gas and PSM may be withdrawn from the storage vessel at (V90). Other configurations with similar purpose and intent also fall within the scope of the claimed inventions.

Large Plasma Reactor Discussion
Large PRR Required—

The large plasma sheet and the large plasma array, whether rectilinear or cylindrical, are designed for the large-scale processing of feed materials in a 3D3P Reactor-given the larger reacting volume, longer reacting times and the improved reacting region geometry allowed by their use. In order to provide for a sufficiently high input mass-flow rate (and for full, uniform heating, gasification and dissociation of the various chemical species), a suitable plasma volume must be generated and a sufficiently long plasma reaction-residency time must be attained.

An Atypical Reactor—

The input volume and mass-flow rate, reaction objectives and the characteristics of the feed materials will in part dictate the geometric and other physical parameters of the reactor. Disclosed here is an example high mass-flow rate 3D3P Reactor with the objective of large-scale production of H-Syngas derived from feed materials. Other sizes and designs with similar purpose fall within the intent of this patent.

A large-scale reactor is assumed in the disclosed 3D3P Reactor (FIG. 8). One or more 3D3P Reactors may be used. In one example carbon avoidance technology ("CAT") design, they are sized to process between 1.0 and 1.5 million pounds of feed materials per hour for an 850 MW power plant, although 3D3P Reactors sized larger or smaller, like the disclosed micro-reactor train, may also be used. The exact size, design, and physical shape of the reactor(s) will depend on the type and composition of the feed materials and the desired overall throughput of the reactor(s), among other factors. The design and use of thermal and chemical reactors is well understood by those skilled in the art.

The number and design of plasma sheets, plasma arrays, plasma cylinders, plasma injectors, micro-plasma injectors; and/or similar PRR forming means, used in the 3D3P Reactor or micro-reactor train, the power rating of each, the capacity and process objectives for the feed materials, the size and capacity of the H-Syngas cleaning system, and, in the case of electric power generation, the number and size of any fuel cells and/or combined cycle combustion and steam turbines, are all variables to be determined in accordance with the type and volume of feed materials to be processed by the system, among other factors.

Sensors and Controls—

The 3D3P Reactor disclosed in FIG. 8 and the micro-reactor train disclosed in FIG. 9 through FIG. 16 contain sensors and control systems (not shown) to detect, control and maintain the process pressure and temperature inside the reactor within process specifications, as well as gas sampling ports and appropriate gas analysis equipment (not shown) at strategic positions in the reactor to monitor the process. The design and use of such equipment is well understood by those skilled in the art.

Equivalents—

While certain inventions, apparatus, methods, processes and designs have been disclosed here and described with reference to specific preferred embodiments, it should be understood by those skilled in the art that various changes in form and detail may be made therein without departing from the spirit, purpose, intent and scope of the claims.

Power Requirements—

The power requirements of plasma sheets, plasma arrays, plasma cylinders, plasma injectors and micro-plasma injector arrays are considerable and dependent upon the plasma reactor design and feed materials processed. The pyrolytic heating, gasification and dissociation of feed material is a highly endoergic process requiring significant power input.[16] Yet the energy value in the H-Syngas produced is sufficient so as to more than offset this high initial power input.

Substantially Containing Hydrogen—

Most solid starting materials, such as coal and MSW, contain some trapped air and water, as well as bound oxygen. Even after pre-processing some oxygen may still remain in the dried feed materials. Therefore, residual oxygen, and oxygen from dissociation of residual water (and other oxides) remaining in the feed material, are liberated in the plasma reactor. Each contributes oxygen to form oxide by-product gasses in the H-Syngas, such as $SO2$, $NO_R$, $CO$ and $CO_2$. This is why, despite a predominantly hydrogen or inert gas reacting atmosphere, in a reactor operating under pyrolytic conditions, some less desirable gaseous species may still persist in the raw H-Syngas. However, the H-Syngas mix manufactured using the disclosed processes and inventions still is substantially composed of hydrogen gas. Other than for certain gaseous feed materials such as natural gas, these lesser quantities of by-product oxide gases may be unavoidable, given their origins in the feed materials themselves. Yet, the hydrogen content of this manufactured H-Syngas mixture still is much higher than that associated with other coal-based synthetic gases (e.g., CO-syngas) and even exceeds that of natural gas, the cleanest burning of all fossil fuels.

CO-Syngas is Less Desirable—

Some prior patent disclosures (Santen et al) have sought to produce a CO-syngas." CO-syngas contains substantial quantities of carbon-monoxide (CO) along with hydrogen gas, e.g., 60% CO and 40% H in moles. When the CO-syngas is burned, it releases substantial $CO_2$ into the environment. The burning of CO-syngas is less desirable than burning the H-Syngas mixture, which is primarily composed of hydrogen, e.g. 93% H and 7% CO in moles. The disclosed processes and inventions seek to minimize the burning of carbon and CO, and thereby to minimize the formation, release and/or need for sequestering of $CO_2$.

Bed Reactors are Less Desirable—

Bed reactors/burners suffer at least two deficiencies. First, they often do not reach sufficiently uniform high temperatures to fully dissociate desirable chemical species. Second, they usually employ an oxidizing atmosphere, containing air or an oxygen-enriched (or partially oxygen—depleted) atmosphere, resulting in the undesirable burning of carbon, $CO_2$ release into the environment, or the need for some kind of $CO_2$ capture, compression, storage, transport and sequestrating. The burning of carbon in a bed reactor (or otherwise) is viewed as less desirable than burning the H-Syngas mixture which is substantially composed of hydrogen.

Sequestering of $CO_2$ is Less Desirable—

The disposal of carbon dioxide involves the capture, compression, storage, transport and sequestering of CO2, for example through deep well injection.[18] There are a number of costs and risks associated with sequestrating CO2.[19,20,21,22] Sequestering is an immature field, and as yet the costs and risks are relatively uncertain.[23] This cost and risk uncertainty may result in an unacceptable outcome for many potential sequestering sites. It is believed that the burning of fossil fuels with capture and re-sequestering of $CO_2$ is less desirable than burning H-Syngas, which is substantially composed of hydrogen. Using H-Syngas would presumably involve a variety of alternate uses for the by-product carbon, such as manufactured carbon products, and the sequestering of excess unburned carbon, perhaps in a stable soot-entombing vitreous form, returning it unburned to the source underground coal mine. Further, it is asserted that CO2 sequestering is likely to be less economical, at least in the short-run and perhaps in the long-term, as well, when all the external environmental risks and consequences are considered. As a result, sequestering may prove to be technically, geologically, socially and/or politically infeasible for a wide range of applications and potential sites. Locating acceptable long-term, permanent injection sites for the large-scale sequestrating of $CO_2$ may be highly problematical, severely limiting the sites available and the viability or usefulness of sequestering as a potential solution to this $CO_2$ disposal problem.

Starting Materials Discussion

Natural Gas as a Starting Material

Natural gas is a nearly ideal feed material for the 3D3P step. It is very dry. So, it requires no drying, while still limiting introduced moisture, and thereby $CO_2$ formation. It contains almost no oxygen and few impurities, limiting other by-product gases. It has a high hydrogen-to-carbon ratio ($CH_4$ has a 4:1 H:C ratio) allowing for the production of more hydrogen per kilogram than from any other feed material. Natural gas may be used as both a process gas to create plasmas and as a feed material to produce H-Syngas. The +1-Syngas derived from natural gas is a hot nearly pure hydrogen gas mixture which is highly compatible with the disclosed high-temperature process-matched solid oxide fuel cell. It produces carbon black or soot as its primary by-product, and due to its purity, the resulting H-Syngas mixture burns cleanly primarily producing water vapor. Its major shortcoming is the bound carbon, otherwise it is only one step removed from H-Syngas. The 3D3P step separates the hydrogen from the unwanted carbon in the natural gas to create the sought after high hydrogen-to-carbon ratio H-Syngas mixture. The following table examines the predominant chemical species in natural gas (methane, formula CH4).

| Chemical Formula . . . predominant species = CH4 | | | | |
|---|---|---|---|---|
| | Molar Weights | Formula | Enthalpy | |
| Natural Gas | g/mol | | klimol | kJ/g |
| Carbon | 12.011 | C | (394) | (33) |
| Hydrogen | 1.008 | H | (143) | (142) |
| $CH_4$ | 16.043 | $CH_4$ | (966) | (60) |
| Fraction of Enthalpy released by burning hydrogen . . . 59% carbon 41% | | | | |

Coal as a Starting Material

Plasma Pyrolysis of Coal—

One of the few carbon avoidance technologies (CAT's) which might be referred to as a near-clean coal technology is the plasma pyrolysis of coal disclosed here. Briefly, dried pulverized or powdered coal is introduced into a high-temperature reactor and exposed to an oxygen-free plasma. The disclosed plasma pyrolysis process does not introduce air, water, steam or oxygen into the reactor, as other designs would. All thermal and chemical reactions within the plasma reactor occur without introduced oxygen. The high temperature plasma first volatizes the oils and tars in the coal and then thermally decomposes them into their constituents, liberating substantial hydrogen. A unique, high-hydrogen, low-carbon H-Syngas mixture is thereby formed.

The resulting H-Syngas is substantially composed of hydrogen, but may also contain small amounts of carbon-monoxide (CO). The molar hydrogen-to-carbon ratio is typically more than 10:1. Open cycle burning of this high hydrogen, low-carbon H-Syngas, say in a combustion turbine associated with a CCU, releases less $CO_2$ per kilowatt-hour generated than the open-cycle burning of natural gas. It is at least as effective at reducing $CO_2$ emissions as the $CO_2$ management systems in operation or available today, but without the high cost of processing the CO-syngas or its combustion gases for CO2 capture, compression, storage, transport and sequestering.

Coal as a Source for H-Syngas

Purity—

By mass percent, coal consists substantially of carbon, but this is usually mixed with various other chemicals and impurities, including hydrocarbons (oils and tars), water and mineral matter, such as sand and clay. The relative amount of these latter impurities affects the usefulness of the coal as a fuel in an open-cycle furnace. Traditionally, the quality of coal used for open-cycle burning has been determined by its rank and grade. Coal purity has been ranked in an ascending order of its carbon content (going from lowest to highest):

Lignite→sub-bituminous coal→bituminous coal anthracite.

Chemical Composition—

However, by molar fraction coal has approximately equal quantities of carbon and hydrogen, i.e., an H:C ratio of ~1:1. The chemical composition of coal is defined in terms of its proximate and ultimate (elemental) analyses. The parameters of proximate analysis are moisture, volatile matter, ash, and fixed carbon. Elemental or ultimate analysis encompasses the quantitative determination of carbon, hydrogen, nitrogen, sulfur and oxygen within the coal.

The reference coal cited in the NETL papers[24] is used here for discussion purposes. For the plasma pyrolysis process disclosed here, a well-dried version of this pulverized coal is assumed.[25]

Dulong Formula—

The total calorific value $Q_T$ of a coal is the total heat liberated by its complete combustion with oxygen. $Q_T$ is a complex function of the elemental composition of the coal. Dulong suggests using the following formula for $Q_T$—when oxygen in the coal is less than 10%, as measured by mass percent:[26]

$$QT = 337C1,442(H-0/8)+93S$$

where C is the mass percent of carbon, H is the mass percent of hydrogen, 0 is the mass percent of oxygen, and S is the mass percent of sulfur in the coal.

Plasma Pyrolysis of Coals

H-Syngas from Dry Coal—

Modifying Dulong's formula to remove the calorific contribution of carbon, oxygen and sulfur, we get the following approximate hydrogen-only calorific content (QH):[27]

$$QH1,442 \cdot H$$

Taking the ratio of $Q_H$ to QT yields the approximate percentage of total available energy in dry coal that may be derived from burning extracted hydrogen.

| QH/QT | 1,442 · H I [337C + 1,442(H – 0/8) + 93S] |
|---|---|
| | 73 |
| | 303 |
| | 24% or 3,150 Btu/lb. |

So, OH is on the order of 24%·QT.

Hydrogen Plus a Little Carbon—

All coal contains some bound-up oxygen, e.g., 7.7% by mass percent. So, no process involving coal can be completely oxygen free. It is recognized that heat from the plasma will also liberate bound oxygen and drive a small fraction of the carbon (C*) in the coal to react with that oxygen.[28] It will first form carbon-monoxide (CO) in the H-Syngas mix, and then later $CO_2$ when that H-Syngas mixture is burned. So, we may now re-estimate the calorific content of this high-hydrogen, low-carbon H-Syngas mixture ($Q_{H+c}$) as:

$$QH+c*-337 \cdot C*+1,442 \cdot (H-0/8)$$

where C* represents the mass percent associated with reacting a small amount of carbon with all the oxygen (O) bound up in the coal to form carbon-monoxide (CO). Because each carbon bond is more energetic than an oxygen-hydrogen (0-H) bond, formation of CO is preferred to the formation of water, and there is a small net energy gain associated with reacting this small amount of carbon (C*) with the bound oxygen. Under plasma pyrolysis, we know that the only oxygen available to react is that which was originally bound up in and is now liberated from the coal, e.g., from breaking O—H bonds. So, it is assumed that the moles of carbon that are converted to CO is equal the moles of oxygen liberated.[29]

Then Dulong's equation may be re-written as an approximation for $Qii_{i+}c*$ as follows:

| Calorific contribution of H + C* in a low-carbon syngas: |
|---|
| QT = 337C + 1,442(H – 0/8) + 93S |
| QH + c* = 337 · C* + 1,442 · (H – 0/8) |
| $Q_{H+c}*$= 337 · $Awt_c/Awt_o$ · 0 + 1,442 · (H – 0/8) |
| $Awt_c/Awto$ = 0.75 |
| and 337 · $Awt_c/Awt_o$ = 253 |
| $Q_{ii+c}*$= 253 · 0 + 1,442 · H – 180.25 · 0 $Q_{H+c}*$= |
| 73 · 0 + 1,442 · H |

This adjustment has been estimated for an example coal containing 7.7% bound oxygen by mass percent. The adjustment recognizes the reaction of this contained oxygen (0) with a small amount of carbon (C*) first to make carbon-monoxide (CO) and then later to $CO_2$. The CO reaction is predominant under plasma pyrolysis at temperatures above 800° C.[30] The formation of CO2 is assumed to occur later when this high-hydrogen, low-carbon synthetic gas (or H-Syngas) mixture substantially composed of hydrogen is reacted with oxygen, perhaps in a combustion turbine, a reciprocating internal combustion engine or a fuel cell. The approximate fraction of total energy ($Q_T$) recovered from plasma pyrolysis of coal into this high-hydrogen, low-carbon H-Syngas may then be expressed as:

| Energy release from plasma pyrolysis of coal: | | |
|---|---|---|
| H + C* – 73.0 + 1,442 · H | | |
| QH + C* | 79 | |
| QH + c*/QT | 79/303 | = 26% |
| QT | = | 13,126 Btu/lb. |
| H + C* | = | 3,402 Btu/lb. |

However, it is important to note that the chemical composition of this unique H-Syngas mixture—formed from the disclosed plasma pyrolysis of coal—differs materially from the CO-syngas derived using other processes. Those other processes are designed to gasify all the carbon in the feed coal. Their CO-syngas is much higher in carbon-monoxide. So, these other processes cannot be referred to as carbon avoidance technologies. It is estimated that a plasma process operating under pyrolysis will convert only a fraction (e.g., up to 7.7%) of the carbon in the feed coal to carbon-monoxide. Hydrogen continues to predominate in this unique manufactured H-Syngas mixture and supplies most of the energy extracted from the coal in this way.[31] The following table estimates the hydrogen-to-carbon ratio for this high-hydrogen, low-carbon coal-based H-Syngas mixture, and the energy released by its open-cycle burning relative to $Q_T$.

| Relative calorific contributions in low-carbon plasma syngas: Calorific Quant. –%/$0_T$ Btu/lb. Hydrogen-to-carbon ratio | | | | |
|---|---|---|---|---|
| For open cycle burning of coal: | | | | |
| QT = | 100% | 13,126 | 1:1 | $mol_{cs}/mol_c$ |
| For Plasma Pyrolysis Reacting of Coal: | | | | |
| | 24% | 3,150 | | |
| | 2% | 252 | | |
| $Q_{ti+c}*$Q | 26% | 3,402 | 12:1 | $mol_H/mol_c$ |

Taking the ratio of $Q_i i+c*$ to $Q_T$ yields the approximate percentage of total energy that may be derived from the example coal by extracting this high-hydrogen, low-carbon H-Syngas mixture. In this case, approximately 26% out of the 13,126 Btu/lb.[32] or about 3,402 Btu/lb. would be captured by the disclosed high-temperature plasma pyrolysis process.[33] Also note that the hydrogen-to-carbon ratio[34] of this high-hydrogen, low-carbon H-Syngas mixture is on the order of 12:1. This is 3-times better than the hydrogen-carbon ratio achievable from the open-cycle burning of natural gas (4:1). For this example coal and the resulting H-Syngas mixture, about 93% of the energy comes from hydrogen and 7% from carbon-monoxide. As a point of reference, we note that during the open-cycle burning of natural gas (the cleanest naturally occurring fossil fuel) about 59% of the energy released comes from hydrogen, while the remaining 41% comes from burning carbon and producing $CO_2$.

Example Wet Coal—

The preceding example assumed thoroughly dried powdered coal, with no entrained moisture. However, more often than not there is residual water trapped in the feed coal. Modifying this dry coal assumption to account for contained moisture has an impact on the resulting H-Syngas mixture, its calorific content and hydrogen-to-carbon ratio. Both water and air can contribute oxygen to the process and produce additional CO in the resulting syngas. Dissociation of water also contributes hydrogen through a water-shift reaction. The CO adds carbon and energy potential to the H-Syngas mixture, but also increases the amount of $CO_2$ produced when it is burned.

Assume that the dried powdered feed coal still contains 1.1% residual water by mass percent. Then the calorific content of the H-Syngas would increases about 3% from the additional carbon reacted with the oxygen contained in the entrained water. Further, the energy contribution from hydrogen contained in the H-Syngas mixture increases (i.e., through the water shift reaction) and the hydrogen-to-carbon ratio increases, since water ($H_2O$) contains 2 hydrogen atoms for each oxygen atom reacted with carbon. However, overall $CO_2$ emissions also increase for this coal.[35]

Relative calorific contributions in low-carbon plasma syngas: Calorific Quant. $-\%/19_T$ Btu/lb. Hydrogen-to-carbon ratio For open cycle burning of coal.•

| | | | | |
|---|---|---|---|---|
| QT = | 100% | 13,126 | 1:1 | $mol_{cs}/mol_c$ |

For Plasma Pyrolysis Reacting of Coal.•

| | | | | |
|---|---|---|---|---|
| QH | 25% | 3,282 | | |
| $Q_c$* | 2% | 231 | | |
| | 27% | 3,512 | 12.2:1 | $mol_H/mol_c$ |

In any case, the H-Syngas mixture produced by the disclosed plasma pyrolysis of coal is a unique, high-hydrogen, low-carbon synthetic gas mixture substantially composed of hydrogen, but with a small amount of CO from reacting carbon with any bound and entrained oxygen.

Temperature and Hydrocarbon Formation—

At higher temperatures, where stable hydrocarbons do not persist in the plasma-gas mixture, the primary 3D3P step reaction products are hydrogen and carbon soot. Yet, at lower temperatures, the plasma-gas mixture could support the formation of certain less desirable stable hydrocarbons by-products, such as Acetylene ($C_2H_2$). Should the temperature fall to 800° C., then a significant fraction of the carbon soot and hydrogen in the mixture would react to form stable hydrocarbons. The presence of such stable hydrocarbons in the mixture would increase the energy produced when burned. However, they would also increase the carbon content and lower the hydrogen-to-carbon ratio of the mix. The undesirable result would be higher $CO_2$ emissions. For example, converting 12% of the carbon soot into stable hydrocarbons reduces the resulting molar hydrogen-to-carbon ratio from 12.2:1 to 4:1. This is the same hydrogen-to-carbon ratio as may be found in methane ($CH_4$), the primary component in natural gas. See the example provided below.

Hydrogen-to-Carbon ratio for meduim-carbon gas at ~800° C.: Calorific Ouant $-\%/Q_T$ Btu/lb. Hydrogen-to-carbon ratio For open cycle burning of coal:

| | | | | |
|---|---|---|---|---|
| QT = | 100% | 13,126 | 1:1 | $mol_{cs}/mol_c$ |

For Plasma Pyrolysis Reacting of Coal:

| | | | | |
|---|---|---|---|---|
| QH | 25% | 3,282 | | |
| QC*– | 7% | 919 | | |
| QH,c./QT– | 32% | 4,200 | 4:1 | $mol_H/mol_c$ |

Therefore, maintaining the 3D3P step at the right higher temperature is essential to manufacturing a plasma-gas mixture with the targeted, high hydrogen-to-carbon ratio, e.g., >10:1. The unique high-hydrogen, low-carbon H-Syngas mixture sought here is only formed using the high temperature 3-dimensional 3D3P plasma pyrolysis process disclosed here, where hydrocarbons are neither stable nor persistent. At lower temperatures, e.g., at 800° C., certain stable hydrocarbons could form and persist. Then the resulting hydrogen-to-carbon ratio would shift downward toward that of natural gas (4:1), and ultimately toward that of CO-syngas as all the carbon was converted into hydrocarbons and CO. That is why it is important (i) to maintain a high, uniform temperature for the PRR and H-Syngas, (ii) to physically separate the hydrogen in the H-Syngas from the carbon (before cooling), and/or (iii) to extract the hydrogen at high temperature when in the presence of carbon, e.g., in an integrated PM-SOFC operating at the high temperatures where stable hydrocarbons do not form or persist. These disclosed inventions and approach limit the undesirable formation of stable hydrocarbons as precursors to the by-products CO and $CO_2$.

Other Factors

It is posited that any disadvantages associated with H-Syngas manufacture may be offset by other factors. Those other factors work toward improving the relative benefits of H-Syngas. They include, but may not be limited to:

The End-Use Effect—The ability to use H-Syngas:
  in very high efficiency end-uses, e.g., in high efficiency combined cycle electric generators and high efficiency fuel cells, and
  for more specialized end-uses, such as in transportation, where in both instances solid coal is not a viable option and where CO-syngas[36] manufactured from coal would result in an undesirably large release of $CO_2$.

The Carbon Effect—When the economic cost of carbon is considered, either:
  indirectly—when currently unaccounted for external environmental costs of carbon release are considered as externalities[37] i.e., the Greenhouse Effect and its negative impact on the global economy, or
  directly—under a carbon tax, a cap-and-trade system or alternatively when the cost of $CO_2$ capture, compression, storage, transport and sequestering is considered,
  both of which militate against the open-cycle or closed-cycle burning of the carbon contained in starting materials, such as coal.

CCU Efficiency—

For example, examine the net heat rate of a typical sub-critical coal-fired steam electric generator of about 10,000 Btu/kWh (34% efficient). That efficiency can fall to 25-28% when $CO_2$ capture is added. The comparable heat rates achievable for a combined cycle unit (CCU) electric generator can be on the order of 7,000 Btu/kWh (49% efficient), a significant efficiency improvement. Yet, solid coal cannot be burned in a CCU. The 3D3P Reactor and micro-reactor train disclosed here serve a similar function to the gasifier in an IGCC,[38] forming a burnable gas mixture, but minimize the undesirable release of $CO_2$ or the need for extensive, costly $CO_2$ capture, compression, storage, transport and sequestering. These efficiency and cost advantages help to offset any disadvantages of H-Syngas.

Fuel Cell Efficiency—

Consider the efficiency of burning hydrogen from H-Syngas in a fuel cell. Solid coal is not an option for this end-use. Assume a high-temperature, high-efficiency solid oxide fuel cell, like the PM-SOFC disclosed here, with an efficiency of up to 75%, meaning that up to 75% of the energy contained in the H-Syngas is converted into electrical energy. This efficiency is at least similar to and can be much better than that of a CCU burning natural gas. This efficiency advantage helps to offset any disadvantages of H-Syngas.

Transportation Fuel—

There are a number of car and bus designs based on fuel cell technology being researched today. For example, Honda has announced the release of a hydrogen-fueled vehicle.[39] Similar to other fuel-cell powered vehicles, this new automobile runs on electricity generated by a reaction between hydrogen and oxygen producing water as the by-product.

The Cost of Carbon Emissions—

Gasified coal (CO-syngas) may be used for some applications. However, when burned, it also releases $CO_2$ to the atmosphere or requires massive $CO_2$ capture, compression, storage, transport and sequestrating processes. So, by way of a further example, assume that open-cycle carbon emissions are taxed, are subject to a cap-and-trade system, or incur added costs for $CO_2$ capture, compression, storage, transport and sequestering. Then the scales again tip in favor of H-Syngas. We will assume a carbon tax here for discussion purposes.

A Carbon Tax—

Views on a carbon tax range all over the map from a low of $5/ton[40] to $37/ton for a "starter tax"[41] to a higher shadow price of $200/ton[42] (or more) of carbon emitted to the environment in $CO_2$ or to $340/ton[43] of emitted $CO_2$. Given the potential for limitations on carbon emissions, not burning (or burning far less) carbon becomes a major advantage for H-Syngas.

Carbon Sequestering—

Disposing of carbon by sequestrating $CO_2$ can also be very expensive. Using present technology, estimates of sequestering costs are in the range of $100 to $300/ton of carbon." This range generally aligns with that for the carbon tax. So, the projected cost impact of $CO_2$ capture, compression, storage, transport and sequestering on coal-fired electric generation is expected to be comparable to that resulting from a carbon tax. Improving technology may allow for increased efficiencies and perhaps lower disposal costs in the future. However, even then finding acceptable long-term permanent injection sites for $CO_2$ sequestrating may be highly problematical.

Carbon Management Comparison

Advanced fossil fuel combustion technologies may be separated into two groups:

Carbon Mitigation Technologies (CMT's), and
Carbon Avoidance Technologies (CAT's).

Carbon mitigation technologies include the technologies for carbon-dioxide (CO2) capture, compression, storage, transport and sequestering. Alternatively, carbon avoidance technologies are a group of technologies which seek to avoid burning carbon, rather than mitigating the effects of $CO_2$ after the fact. CMT's and CAT's are fundamentally different philosophical and technological approaches to addressing the same question, i.e. "What should we do with the carbon contained in fossil fuels?" CMT's assume the continued burning of carbon and production of $CO_2$. CMT's then seek to mitigate the combustion process by attempting to isolate a portion of the $CO_2$ produced from the environment, e.g., through deep well sequestering. No CMT yet captures all $CO_2$ from the combustion stream, so some amount is still released into the environment. Current CMT's release the equivalent of about one-quarter of the $CO_2$ contained in combustion gases into the atmosphere, sequestering about three-quarters of the $CO_2$ relative to current open-cycle burners (when the effects of efficiency and availability are considered).[45] So, bottom line, CMT's attempt to re-engineer a way through the $CO_2$ emissions problem, rather than finding a way to avoid it.

Alternatively, rather than attempting remediate $CO_2$, CAT's attempt to redesign key process steps as a way around the $CO_2$ problem. CAT's seek to substantially avoid the oxidation of carbon and the production of $CO_2$ in the first place. Current CAT's do not completely avoid the release of $CO_2$, but do limit it to significantly less than one-quarter of the amount per kilowatt-hour (kWh) released by current coal-fired generation.

Plasma Pyrolysis—

The promising carbon avoidance technology (CAT) disclosed here is the 3-dimensional high-temperature plasma pyrolysis of naturally dry hydrogen-bearing gases and oils, and of thoroughly dried starting materials. The disclosed plasma pyrolysis process manufactures a unique H-Syngas mixture that is high in "green" hydrogen and low-carbon. $CO_2$ emissions resulting from the open-cycle burning of this H-Syngas mixture are lower than those associated with any conventional technology, including natural gas-fired power plant designs. It appears possible that this unique high-hydrogen, low-carbon H-Syngas mixture may be used to generate electric power more economically, with a lower capital investment, with greater availability, and at higher efficiency, than is possible with other $CO_2$ management technologies, while dramatically reducing $CO_2$ production and $CO_2$ emissions for a low-carbon future.

—End of Discussion—

Figures Follow

ENDNOTES

[1] Pyrolysis defined—Pyrolysis is the chemical decomposition of materials by heating in the absence of oxygen or any other reagents. See http://en.wikipedia.org/wiki/Pyrolysis.

[2] Global warming defined—See http://en.wikipedia.org/wiki/Global_warming

[3] Carbon cycle defined—See http://en.wikipedia.org/wiki/Carbon_cycle

[4] U.S. DOE EIA, Carbon Coefficients and Assumptions, p. 4, Direct Global Warming Potential, p. 20 at http://www.eia.doe.gov/pub/oiaf/1605/cdrom/pdf/gg-app-tables.pdf

[5] Greenhouse gases defined—See http://en.wikipedia.org/wiki/Greenhouse_gas

[6] The Greenhouse Effect defined—See http://en.wikipedia.org/wiki/Greenhouse_effect

[7] Hydrogen Economy defined—See http://en.wikipedia.org/wiki/Hydrogen%5Feconomy

[8] Nevertheless, controversy over the usefulness of a hydrogen economy have been confused by issues of energy sourcing, including fossil fuel use, greenhouse warming, and sustainable energy generation. These are separate issues, although the hydrogen economy impacts them all.

[9] Vitreous defined—See http://en.wikipedia.org/wiki/Vitreous

[10] Pyrolysis defined—Pyrolysis is the chemical decomposition of materials by heating in the absence of oxygen or any other reagents. See http://en.wikipedia.org/wiki/Pyrolysis.

[11] "The content of $O_2$ in the exhaust gas from the combustion of air and natural gas in a gas turbine is in the magnitude of 12-18% $O_2$." See http://www.patentstorm.us/patents/6595291/description.html

[12] e.g., 4,000 to 7,000 or >7,000 degrees Celsius. See www.hartfordinfo.org/issues/wsd/landfill/EngEnvApp.pdf

[13] "The temperature at the core of the plasma arc is about 6000° to 10,000° Celsius." See http://www.inentec.com/faq3.html

[14] "The Thermal Transformation process uses a high temperature (up to 8,000 degrees Fahrenheit.) plasma arc technol-

[15] "1100 to 1400 degrees Celsius" Id.

[16] See http://www.westinghouse-plasma.com/gasif.htm "The plasma torch power requirement ranged from 100 kW to 250 kW per ton/hr of MSW/ASR/Coal and higher for inorganic waste treatment/vitrification."

[17] Syngas defined. See http://en.wikipedia.org/wiki/Syngas

[18] Carbon sequestration is the term describing processes that remove carbon to help mitigate global warming, a variety of means of artificially capturing and storing carbon are being explored. Carbon sink and sequestering defined. See http://en.wikipedia.org/wiki/Carbon_sequestration

[19] Coal bed sequestration risks discussed. See http://www.osti.gov/bridge/servlets/purl/815530-DpCR2M/native/815530.pdf

[20] "[Certain] events could lead to $CO_2$ leakage, compromising the storage effectiveness and possibly posing risks to the environment and human health." See http://www.llnl.gov/str/May05/Friedmann.html

[21] Carbon sequestration "Risk/Uncertainty—Costs, Environment, Safety and health, Technical feasibility and efficiency" See http://www.westcarb.org/pdfs/co2sequest.pdf

[22] "In no way, however, should geologic carbon sequestration be seen as a "silver bullet" to reducing emissions, nor should it be researched and developed at the expense of other environmentally sound, technologically feasible, and economically affordable solutions to climate change." Union of Concerned Scientists. See http://www.ucsusa.org/global_warming/solutions/geologic-carbon-sequestering.html

[23] "More research is needed before risk profiles for geological reservoirs can be created." See http://www.dti.gov.uk/files/file18859.pdf

[24] See www.gasification.org/Docs/Workshops/2007/Denver/02%20Ciferno.pdf and http://www.netl.doe.gov/energy-analyses/baseline_studies.html

[25] Dried example coal elemental analysis (in mass %):

| Dried Illinois #6 | |
| --- | --- |
| Analysis of example coal | wt. % |
| Carbon (C) | 70.9% |
| Hydrogen (H) | 5.0% |
| Nitrogen (N) | 1.4% |
| Sulfur (S) | 2.8% |
| Oxygen (O) | 7.7% |
| Ash | 11.1% |
| Moisture (H2O) | 1.1% |
| Total | 100.0% |

[26] A useful formula to check the measurement of specific energy is the Dulong formula, which calculates specific energy from the ultimate analysis. The calculated values are usually within about 2% of measured values for the rank of bituminous coal and above. With these constants, Q is given in kilojoules per kilogram. See http://en.wikipedia.org/wiki/Energy_value_of_coal.

[27] The disaggregation of Dulong's formula is used here as a teaching tool and for sake of simplicity. It provides approximate values for hydrogen energy production. However, a more rigorous study would perform a molar enthalpy analysis of using high temperature plasma pyrolysis of feed coal to make manufactured syngas.

[28] The C—O bond and reaction is preferred to the S—O and O—H bonds and reactions, so for our purposes here and to simplify the analysis we assume that all the contained oxygen in the coal reacts with carbon, but not with the hydrogen or sulfur. At this point in the paper, we also assume dry coal with no entrained water and air.

[29] However, a mole of oxygen and a mole of carbon are not of equal atomic weight (Awt) or molar mass, so an adjustment is needed to accommodate the mass percents used in Dulong's equation. We can make this adjustment by using the ratio of the two different atomic weights, thereby adjusting the oxygen mass percent used for Dulong's equation to compute the mass percent of carbon reacted with contained oxygen to form CO. This requires we multiply the oxygen mass percent by the relative atomic weight ratio of carbon to oxygen to infer C*. That is, we may calculate C* as the product of $Awt_C/Awt_O \cdot O$, i.e., by multiplying O by the ratio of $Awt_C$ (12.011) divided by $Awt_O$ (15.9994).

[30] "Above 800° C., CO is the predominant product" see http://en.wikipedia.org/wiki/Carbon_monoxide

[31] The presence of entrained water and air in the feed coal would change the results somewhat depending upon the amounts entrained. Both water and air would release additional oxygen into the plasma which would also react with small additional amounts of carbon, and in the case of entrained water, would add some hydrogen. It is likely that the presence of water and air in the feed coal would increase the gross calorific content of the resulting manufactured gas and increase the energy percentage up to about 30% and the per unit toward 4,000 Btu/lb, before adjusting for plasma energy inputs.

[32] Available from the open-cycle burning of this example coal.

[33] This analysis does not yet account for plasma electrical energy inputs or any energy recovered from the high temperature plasma mix in the combined cycle unit.

[34] i.e., the ratio of the moles of hydrogen to the moles of carbon reacted or $mol_H/mol_C$.

[35] This calculation does not yet account for the plasma input energy required to volatize the feed coal and this amount of entrained water. That would normally affect the overall plant efficiency by somewhat reducing net electrical output. However, also note that any energy used to dissociate the moisture is partially recovered from the syngas when it is burned and the constituents are returned to water vapor and converted to $CO_2$. So, this plasma input heat (needed to dissociate the moisture in the coal) is recycled as the heat associated with formation of water vapor and $CO_2$ in the combined cycle unit combustion products, and this heat energy is converted back to electricity, recycling a portion of this starting plasma energy, subject of course to the thermodynamic efficiency of the system.

[36] Syngas defined—See http://en.wikipedia.org/wiki/Syngas

[37] Externalities defined—See http://en.wikipedia.org/wiki/Externality

[38] For IGCC see http://www.ge-energy.com/prod_serv/products/gas_turbines_cc/en/igcc/index.htm

[39] See http://www.cbc.ca/money/story/2006/09/25/tech-diesel-060925.html

[40] See The Lincoln Plan at http://www.climateark.org/lincoln_plan/

[41] "The $37 per ton of carbon "starter tax" mentioned earlier, equating to around 10 cents a gallon of gasoline, fits the lower end of that range." See Carbon Tax Center at http://www.carbontax.org/faq/

[42] "We found that a typical shadow price on carbon (a carbon fee or tax, for example) to prevent the concentrations of $CO_2$ from more than doubling was around $200 per ton Carbon emitted." See Statement of Stephen Schneider, Ph.D., Professor, Department of Biological Science, Stanford University, Stanford, Calif., Testimony Before the House Committee on Ways and Means, Feb. 28, 2007 at http://waysandmeans.house.gov/hearings.asp?formmode=view&id=5564

[43] "Most luxury homes in Aspen, Colo. contain energy-guzzling amenities such as heated driveways and outdoor pools. In response, Pitkin County has implemented the world's stiffest tax on carbon emissions, rated at $340 per ton of carbon dioxide, as part of a plan to finance green projects in the region." (Christian Science Monitor) See http://www.globalpolicy.org/socecon/glotax/carbon/2003/0109aspen.htm

[44] See http://www.fossil.energy.gov/sequestration/overview.html

[45] "Analysis shows that capturing $CO_2$ from power plant flue gas and sequestering it in underground storage such as a gas field, oil field, or aquifer can reduce the GWP (global warming potential) of electricity production but the penalty is an increase in fossil energy consumption. First, capturing and compressing flue gas $CO_2$ results in a large decrease in the power plant efficiency. Secondly, maintaining a designated plant capacity means that additional electricity production must come from another source, most likely fossil. Therefore, although there is a substantial decrease in the GWP, sequestering 90% of the $CO_2$ from the power plant flue gas does not equal a 90% reduction in the GWP per kWh of electricity produced." See www.netl.doe.gov/publications/proceedings/01/carbon_seq/p4.pdf *Capturing and Sequestering CO2 from a Coal-fired Power Plant—Assessing the Net Energy and Greenhouse Gas Emissions*, Pamela L. Spath and Margaret K. Mann, National Renewable Energy Laboratory, 1617 Cole Boulevard, Golden, Colo. 80401.

What is claimed:

1. An apparatus for producing hydrogen, comprising:
    a preprocessing apparatus configured to supply hydro-carbon feed materials to a cylindrical or frustum shaped reaction chamber at or near atmospheric pressure and perform more than one of the following functions:
        feed material drying, dried feed material storage, feed material pulverizing and/or
        powdering, carrier gas injection and mixing with feed materials, gaseous feed
        material decompression, flow control, and feed material pre-heating;
    the cylindrical or frustum shaped reaction chamber containing at least one cylindrical or frustum shaped plasma injection array;
        wherein a plurality of plasma injectors positioned in a circular fashion around the exterior of and feeding into the cylindrical or frustum shaped reaction chamber, a plurality of plasma sources proximally located to the plurality of plasma injectors, and at least one centrally located feed material injector positioned above the at least one cylindrical or frustum shaped plasma injector array,
            wherein each of the plurality of plasma sources are positioned such that each plume emanating from each plasma source overlaps at least one other plume emanating from another plasma source forming a plasma sheet and a resulting three-dimensional reaction volume,
                wherein the three-dimensional reaction volume is a substantially oxygen free, plasma reaction region having a temperature greater than 800° C. causing the hydro-carbon feed materials to dissociate into hydrogen and carbon by plasma pyrolysis and limit formation of carbon-oxygen species, and
            wherein the at least one hydro-carbon feed materials from the preprocessing apparatus is introduced into the three-dimensional reaction volume of the cylindrical or frustum shaped reaction chamber via the at least one centrally located feed material injector;
    a flow processing train comprising a reacting region and a particulate separation mechanism, located downstream from said cylindrical or frustum shaped reaction chamber,
        wherein said reacting region provides an enclosed space for the addition of chemicals to the contained gases and plasmas;
    an outlet located in a base region of the flow processing train,
        wherein the outlet enables hydrogen gas to leave the flow processing train and enter a hydrogen sieve; and
    the hydrogen sieve comprising a structure that is selectively permeable to hydrogen,
        wherein the hydrogen sieve is integrated with a fuel cell with the fuel cell being oriented to allow hydrogen gas into a reaction region of the fuel cell and to limit water from interacting with hydro-carbon feed material byproducts.

2. The apparatus of claim 1 wherein the plurality of plasma sources are individually angled with respect to a reaction chamber normal causing a plasma vortex in the three-dimensional reaction volume.

3. The apparatus of claim 1 wherein two or more cylindrical or frustum shaped plasma injector arrays are arranged to have a parallel cylindrical axis arranged to be parallel to each of the two or more cylindrical or frustum shaped plasma injector arrays but offset from an axis of the cylindrical or frustum shaped reaction chamber, and wherein the hydro-carbon feed materials pass through the two or more cylindrical or frustum shaped plasma injector arrays.

4. The apparatus of claim 1 wherein the hydrogen gas is subsequently introduced into a combustion turbine or combustion engine.

5. The apparatus of claim 1 wherein the hydro-carbon feed materials comprises a hydro-carbon gas.

6. The apparatus of claim 1 wherein the hydro-carbon feed material comprises a pulverized solid hydro-carbon material transported by a carrier gas.

7. The apparatus of claim 1 wherein the cylindrical or frustum shaped reaction chamber is oriented in a predominantly vertical orientation and the hydro-carbon feed materials enter the cylindrical or frustum shaped reaction chamber in an upper region of the reaction chamber and the hydro-carbon feed materials are separated into hydrogen gas and solid carbon and wherein the hydrogen gas is removed in the base region of the reaction chamber via the outlet.

8. The apparatus of claim 1 wherein the hydro-carbon feed materials are dried prior to being introduced into the cylindrical or frustum shaped reaction chamber.

9. The apparatus of claim 1 wherein the hydrogen gas is introduced into a stationary internal combustion engine to produce electrical power.

10. The apparatus of claim 1 wherein the hydrogen gas is introduced into an internal combustion engine.

\* \* \* \* \*